United States Patent [19]

Nishimura et al.

[11] E Re. 31,172

[45] Reissued Mar. 8, 1983

[54] SOUND SYNTHESIZING APPARATUS

[75] Inventors: Satoshi Nishimura, Kagamigahara; Kenichi Sato; Youji Sugiura, both of Gifu, all of Japan

[73] Assignee: Sanyo Electric Co., Ltd., Moriguchi, Japan

[21] Appl. No.: 297,831

[22] Filed: Aug. 31, 1981

Related U.S. Patent Documents

Reissue of:

[64] Patent No.: 4,210,781
Issued: Jul. 1, 1980
Appl. No.: 967,717
Filed: Dec. 8, 1978

[30] Foreign Application Priority Data

| | | | |
|---|---|---|---|
| Dec. 16, 1977 | [JP] | Japan | 52-153275 |
| Dec. 16, 1977 | [JP] | Japan | 52-153276 |
| Feb. 13, 1978 | [JP] | Japan | 53-16046 |
| Mar. 20, 1978 | [JP] | Japan | 53-33492 |
| Apr. 20, 1978 | [JP] | Japan | 53-48872 |

[51] Int. Cl.[3] ..... G10L 1/00

[52] U.S. Cl. ..... 179/15.55 T; 179/1 SM; 179/15.55 R

[58] Field of Search ..... 179/15.55 T, 1 SM, 15.55 R, 179/1 SG; 360/8

[56] References Cited

U.S. PATENT DOCUMENTS

| | | | |
|---|---|---|---|
| 3,575,555 | 4/1971 | Schanne | 179/1 SM |
| 3,803,363 | 4/1974 | Lee | 179/15.55 T |
| 3,936,610 | 2/1976 | Schiffman | 179/15.55 T |

FOREIGN PATENT DOCUMENTS

| | | | |
|---|---|---|---|
| 2519483 | 5/1976 | Fed. Rep. of Germany | 179/1 SM |

*Primary Examiner*—Emanuel S. Kemeny
*Attorney, Agent, or Firm*—Darby & Darby

[57] ABSTRACT

An analog sound signal the time axis of which is compressed is sampled responsive to a write clock signal and the sampled output is stored in an analog shift register having a given capacity, whereupon the stored signal is read out from the analog shift register responsive to a read clock signal the frequency of which is smaller than that of the write clock signal. The above described operation is alternately repeated, whereby the output signal read out from the analog shift register is compiled for sound synthesization. The synthesizing junction of the sound signal is controlled by a microcomputer. The microcomputer is adapted to evaluate the similarity of the data concerning the waveform at the trailing end portion of a preceding sound element stored in the random-access memory and the data concerning the waveform at the leading end portion of the succeeding sound element stored in the random-access memory. Evaluation of similarity of the waveforms is effected by evaluating a mean square error or a mutual correlation function of two sets of data. The shift amount of the leading end of the succeeding sound element to be joined to the trailing end portion of the preceding sound element is determined based upon the result of the evaluation, whereby a read circuit is controlled to correct the time axis of the succeeding sound element, thereby to achieve continuity of the waveform at the synthesizing junction of the preceding and succeeding sound elements.

71 Claims, 24 Drawing Figures

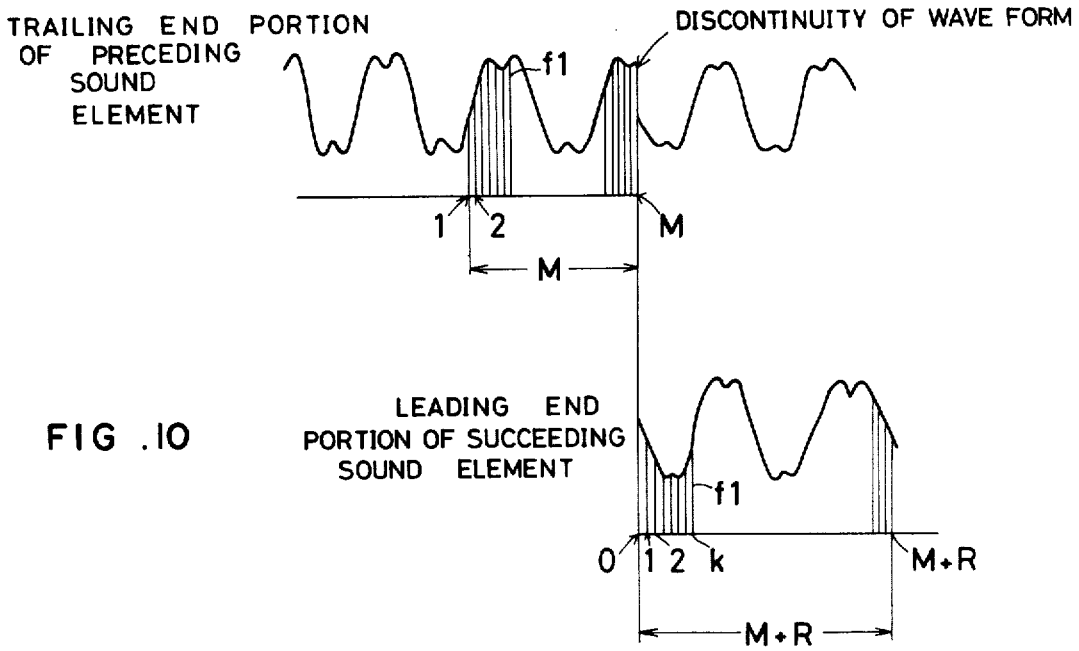
FIG. 10
FIG. 12
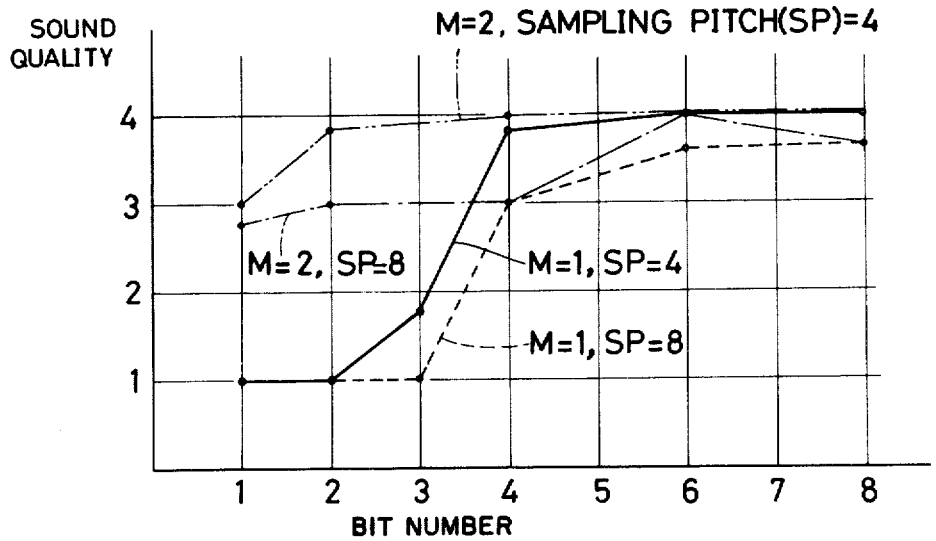

JUNCTION

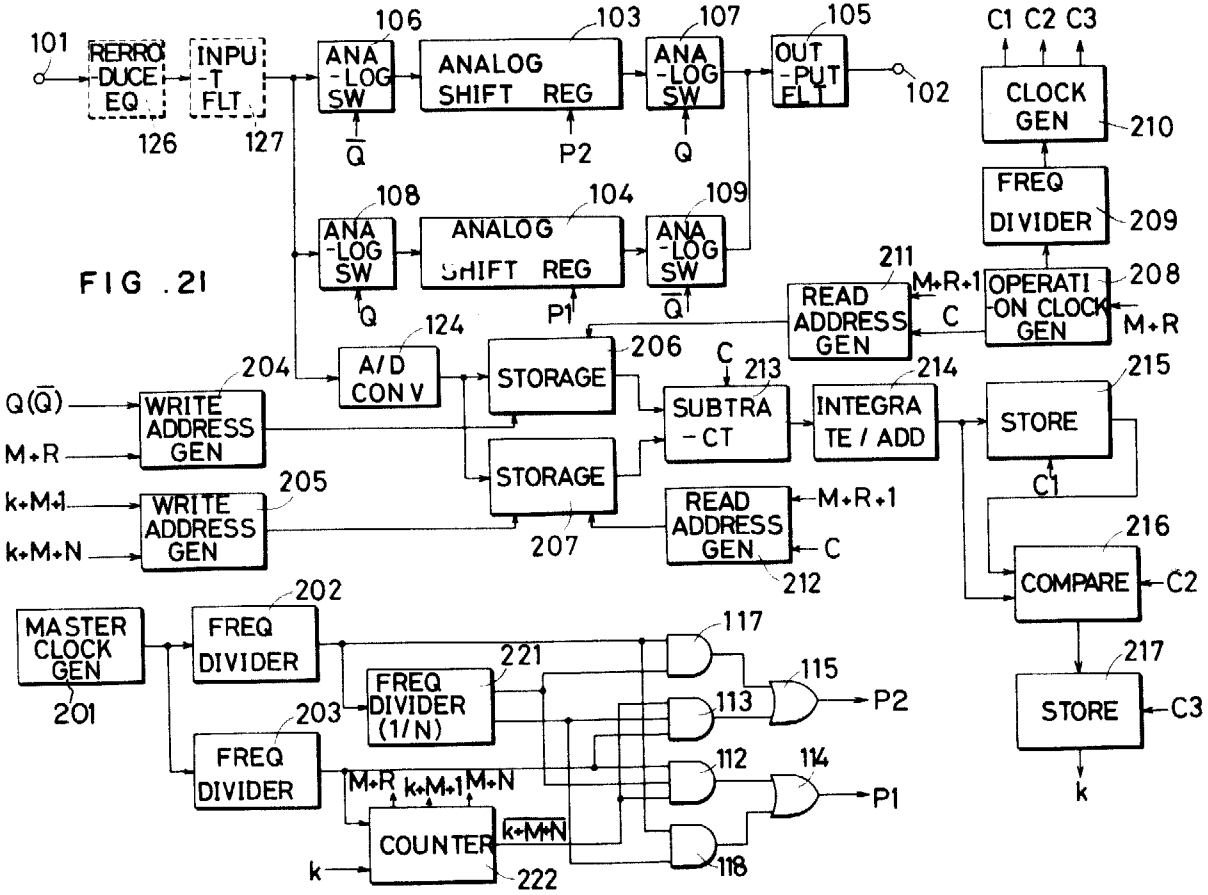
C1 C2 C3
CLOCK GEN
210
FREQ DIVIDER
209
OPERATION CLOCK GEN
208
M+R
STORE
215
C1
COMPARE
216
C2
STORE
217
C3
k
102
OUT-PUT FLT
105
ANA-LOG SW
107
Q
ANALOG SHIFT REG
103
P2
ANA-LOG SW
106
Q̄
INPUT-FLT
127
REPRODUCE EQ
126
101
ANA-LOG SW
109
Q̄
ANALOG SHIFT REG
104
P1
ANA-LOG SW
108
Q
A/D CONV
124
STORAGE
206
STORAGE
207
READ ADDRESS GEN
211
M+R+1
C
INTEGRATE / ADD
214
SUBTRACT
213
C
READ ADDRESS GEN
212
M+R+1
C
WRITE ADDRESS GEN
204
WRITE ADDRESS GEN
205
Q(Q̄)
M+R
k+M+1
k+M+N
FIG. 21
MASTER CLOCK GEN
201
FREQ DIVIDER
202
FREQ DIVIDER
203
FREQ DIVIDER (1/N)
221
COUNTER
222
M+R
k+M+1
M+N
k+M+N
k
117
113
112
118
115
P2
114
P1

SOUND SYNTHESIZING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a sound synthesizing apparatus. More specifically, the present invention relates to a sound synthesizing apparatus wherein a sound element is extracted from an analog sound waveform the time axis of which is compressed and a portion of the waveform of the sound element is subjected to expansion of the time axis, whereby a sound is synthesized that has substantially the same frequency component distribution but has the time duration which is different from the original time duration.

2. Description of the Prior Art

An exchange of information in terms of a sound signal, i.e. a conversation, has an emotional characteristic that is causes a reduced information transmission efficiency. More specifically, the speed of talking by a human being is 110 to 170 words per minute at the most, although a human has an ability to follow in listening to talking at a speed as high as two to three times of a normal speaking speed. Therefore, if sound information of such as a human voice as recorded on a magnetic tape by means of a tape recorder can be reproduced at such a higher speed as comprehensive, it would be much convenient. If such could be achieved, then the contents of a conference, lecture and the like of say one hour can be listened to within half an hour or less, other sound information such as are recorded curriculum can be retrieved at a high speed, and other applications could be developed.

If and when a recorded sound is reproduced at a speed higher than the recording speed, i.e. on the occasion of high speed reproduction, a reproduction time period can be shortened in reverse proportion to the reproduction speed but the reproduced sound frequency increases in proportion to the reproduction speed. A change of the frequency of the reproduced sound that occurs on the occasion of a higher reproduction speed is readily perceived by a listener. Nevertheless, the contents of the reproduced sound can be understood, if the reproduction speed does not exceed a speed as high as 1.5 times the normal speed. However, the contents of the reproduced sound can hardly be understood, when the reproduction speed exceeds two times that of the normal speed.

In order to correct the distortion of the waveform by reproduction at an increased speed, it is necessary to regain the original waveform of the reproduced sound in terms of the time axis. To that end, a variety of research and development have been carried out in the past. One approach is to analyze the spectrum of the sound signal on a real time basis for frequency conversion in a Fourier region, whereupon a reverse synthesization is made. Although this approach allows for a reproduced sound of a good quality, a large scale system is required, which is extremely expensive and hence is of less practicability.

Apparatus employing a relatively simple electronic circuit for time axis conversion of the sound have been proposed and put into practical use. The principle of such sound time axis conversion is shown in FIG. 1. Referring to FIG. 1, an analog sound signal the time axis of which has been compressed is divided at very short time intervals into a succession of sound elements, a portion of each sound element is discarded, the remaining portion of each sound element is expanded in terms of the time axis, and the remaining portion of each sound element, as expanded, is then jointed in a sampling cycle sequence, whereby a reproduced sound of the same frequency as the original sound is obtained with the contents of the reproduced sound condensed in terms of the time axis by discarding a portion of each sound element. Briefly described, the above described sound processing approach is equivalent to a process wherein a recorded magnetic tape is cut into pieces of a predetermined length and every second piece is picked up and compiled into one magnetic tape. Since the magnetic tape after compilation is shorter than the original magnetic tape is, reproduction of the compiled magnetic tape at a normal speed can provide a reproduced sound without alteration of the frequency components of the sound but within a shortened period of time as compared with the time period required for reproduction of the original magnetic tape at a normal speed by a value corresponding to the length of the magnetic tape portions as discarded. Fortunately, the fundamental syllables constituting a talking of the human being have much redundancy and sample duration, say 160 ms on the average, sufficient enough to make the talking comprehensive, even if a portion of the sound is intermittently dropped.

Now a specific scheme for expanding reproduction of a sound waveform as compressed in terms of the time axis through high speed reproduction, as shown in FIG. 1, will be described in the following.

One of such approaches is a digital memory system, which is fully described in Lee, F. F., "Time Compression and Expansion of Speech by the Sampling Method" Audio Engineering Society Preprint, presented as AES 42nd Convention, May, 1972. Another such approach is an analog memory system, which is fully described in Iwamura and Ono, "Capacitor Memory Apparatus", Electronic Communication Society, Conference Text No. 817, September, 1969 and Koshigawa and Tanizoe, "TSC Functioned Cassette Tape Recorder", "Electric Wave Science" February, 1974. A further such approach is a variable delay system, which is fully described in Shiffman, M. M., "Playback Control Speeds or Slows Taped Speech without Distortion" Electronics, Vol. 47, No. 17, Aug. 22, 1974. Still another approach is an analog shift register switching system, which is fully described in U.S. Pat. No. 3,936,610, issued Feb. 3, 1976 to Murray M. Schiffman, Newton, Mass. and entitled "Dual Delay Line Storage Sound Signal Processor".

The present invention is directed to an improvement in such an analog shift register switching system. Therefore, the prior art analog shift register switching system, previously proposed, will be first described in detail in the following.

FIG. 2 is a block diagram showing an example of a sound synthesizing apparatus in accordance with a prior art analog shift register switching system that constitutes the background of the invention. Referring to FIG. 2, an input terminal 1 is connected to receive an analog sound signal obtained through high speed reproduction. The analog sound signal obtained from the input terminal 1 through high speed reproduction is applied through analog switches 6 and 8 to analog shift registers 3 and 4, respectively, each comprising a bucket brigade device of N bits. The outputs of these analog shift registers 3 and 4 are withdrawn through analog switches 7 and 9, respectively, and further through a low pass filter 5 from an output terminal 2. The output terminal 2 provides a recovered analog sound signal obtained as a result of time axis expansion and synthesization by joining pieces of sound elements as expanded, as to be more fully described subsequently. The analog switches 6 and 9 are coupled from the $\overline{Q}$ output of a frequency divider 11 and the analog switches 8 and 7 are coupled from the Q output of the frequency divider 11, so that these analog switches are on/off controlled responsive to the outputs of the frequency divider 11. The frequency divider 11 is structured to achieve frequency division of the clock pulses obtainable from a write clock generator 10 by the factor 1/mN, where m and N are integers, m being described subsequently, whereby the output is alternately obtained by way of the output Q or $\overline{Q}$. The output of the write clock generator 10 and the Q output of the frequency divider 11 are applied to an AND gate 12. The output of the write clock generator 10 and the $\overline{Q}$ output of the frequency divider 11 are applied to an AND gate 13. On the other hand, the clock pulse from a read clock generator 16 is applied to an AND gate 17, which is also connected to receive the $\overline{Q}$ output of the frequency divider 11. The clock pulse from the read clock generator 16 is also applied to an AND gate 18, which is also connected to receive the Q output of the frequency divider 11. The outputs of the AND gates 12 and 18 are applied through an OR gate 14 to the analog shift register 4 as a write clock pulse and a read clock pulse, respectively. Similarly, the outputs of the AND gates 13 and 17 are applied through an OR gate 15 to the analog shift register 3 by way of a write clock pulse and a read clock pulse, respectively.

FIG. 3 is a timing chart for use in explaining the operation of the FIG. 2 system. Referring to FIG. 3, the operation of the FIG. 2 system will be described in the following. During a time period n where the Q output of the frequency divider 11 assumes the logic one, the analog switches 8 and 7 are enabled. At that time, the write clock pulse having a frequency f1 obtainable from the write clock generator 10 is applied through the OR gate 14 to the analog shift register 4, while the read clock pulse having a frequency f2 obtainable from the read clock generator 16 is applied through the OR gate 15 to the analog shift register 3. Accordingly, the analog sound signal having the time axis compressed by the factor m applied to the input terminal 1 is successively loaded into the analog shift register 4 as a function of the write clock pulse in the form of a train of a plurality (mN) samples. However, the analog shift register has an N-bit capacity. Therefore, a smaller plurality (mN-N) samples from the leading end are shifted out from the output terminal of the analog shift register 4 during this period of time t1. However, since the analog switch 9 connected to the output terminal of the analog shift register 4 has been disabled at that time, the signal thus shifted out from the analog shift register 4 is blocked by the analog switch 9.

Then the state of the frequency divider 11 is reversed, whereby the $\overline{Q}$ output becomes the logic one during the following period n+1. During this period n+1, the analog switches 6 and 9 are enabled, while the analog switches 8 and 7 are disabled. As a result, the write clock pulse having the frequency f1 is applied through the OR gate 15 to the analog shift register 3, while the read clock pulse having the frequency f2 is applied through the OR gate 14 to the analog shift register 4. Accordingly, the N-bit sample previously loaded in the analog shift register 4 are in succession read out through the analog switch 9 in response to the read clock pulses of the frequency f2. The analog shift register 3 operates in a reverse manner, such that a read operation is performed during the period n and a write operation is performed during the period n+1. The frequency f1 of the write clock pulse and the frequency f2 of the read clock pulse are selected to satisfy the following equation.

$$f1/f2=m \quad (1)$$

Thus, if the frequencies f1 and f2 of the clock pulses are determined as described above, the time axis of the output sound signal is expanded by m times and the compressed analog sound signal applied to the input terminal 1 is withdrawn from the output terminal 2 as a reproduced sound signal the time axis of which is recovered to the same as that of the original sound signal. Meanwhile, the frequency f2 of the read clock pulse should be determined to satisfy the sampling theory with respect to a necessary output sound frequency band.

The sound quality of the reproduced sound thus obtained from such sound synthesizing apparatus should be good enough not only to enable comprehension of the contents of talking but also to sound like an audible natural-like sound. By way of a criterion as to accuracy with which the linguistic contents are transmitted by a sound, the concept of articulation or intelligibility has been proposed and utilized. The articulation is a percentage of the fundamental constituting elements of a sound for linguistic representation such as a monotone, syllable and the like that are understood correctly by a listener in a communication system. The word "articulation" is customarily used when the contextual relationships among the units of speech material are thought to play an unimportant role. On the other hand, the word "intelligibility" is customarily used when the context is though to play an important role in determining the listener's perception. Either of them is tested by the use of an articulation test table or an intelligibility test table adopted by the Japanese Acoustic Society or the Counsel Committee of International Telegram and Telephone. Thus, it is required that the articulation or the intelligibility of high speed reproduction should be 100 percent at the reproduction speed ratio most often used, say the ratio m is approximately 2. As far as the articulation or the intelligibility is concerned, any of the above described approaches provides a satisfactory result.

The naturalness of a synthesized sound with respect to the original sound obtained by joining short sound elements is also determined, depending on the length of each sound element and processing at the junction. The length of the sound elements, i.e. the repetition period, shown in FIG. 1 was investigated by changing the length to various values and actually comparing the reproduced sound and the result shown in FIG. 4 was obtained. More specifically, FIG. 4 is a graph showing a relation between a sound quality and a repetition period, wherein the abscissa indicate a repetition period and the ordinate indicate a sound quality. The graph was obtained in the manner described in the following. The voice of a male announcer was recorded in a magnetic tape and the sound was reproduced at a reproduction speed ratio of m=2. The reproduced sound was listened to by a plurality of persons and the quality of the sound as listened to was graded in five grades, such as E standing for excellent, G standing for good, F standing for fair, P standing for poor, and B standing for bad. The curve shown in FIG. 4 was plotted by allotting 4, 3, 2, 1 and 0 to the grades E, G, F, P and B, respectively, and adopting the average. Generally, it is difficult to represent the naturalness or audibility of a sound in a quantitative manner and presently such representation is an unsolved field in the acoustic phonetics. Thus, in most cases, such a psychometorical approach based on a subjective judgement has been employed for convenience sake. According to the data shown in FIG. 4, it could be concluded that a proper length of the sound element is 25 to 45 msec. If the repetition period becomes smaller than 25 msec, the number of junctions between adjacent sound elements appearing on the waveform increases, which degrades a sound quality. On the other hand, a sound is also constituted by a time transition of a frequency spectrum, as to be more fully described subsequently and therefore an increase in the repetition period or the length of the sound element accordingly increases unnaturalness by virtue of the discontinuity at the junction of the adjacent sound elements.

A method for joining the adjacent sound elements or processing the junction between the adjacent sound elements considerably influences the quality of a sound obtained by such type of sound synthesizing apparatus. Firstly, a discontinuity of the waveform of the sound signal occuring at the junction of the adjacent sound elements causes a harmonic noise, which reduces the signal to noise ratio of the reproduced and synthesized sound, whereby articulation is degraded. On the other hand, a auditory sensation of a human being is extremely sensible to a variation of the pitch frequency which is a fundamental frequency of the vocal cord vibration. Thus, if and when the pitch frequency components are discontinuous at the junctions, the sound is unnatural and disagreeable to hear. When the pitch frequency components are discontinuous at the junction, the sound is heard as if phlegm obstructs the throat.

Any of the above described approaches can not essentially avoid occurrence of the harmonics and the discontinuity of the pitch frequency components at the junctions. The harmonics noises caused by the discontinuity of the waveforms at the junctions between the adjacent sound elements can be removed by filters to some extent. As described previously, the sampling repetition period is selected to be about 25 to 45 msec. Therefore, assuming that the sampling repetition period is selected to be 25 msec, then the fundamental components of the noise caused by the repetition is about 40 Hz. Since a frequency spectrum higher than 100 Hz is sufficient as an ordinary sound, the above described noises can be removed by using a high pass filter for cutting off the above described lower frequency components. Similarly, other noise components of the frequencies higher than a necessary sound frequency region can be removed by using a low pass filter of a proper frequency characteristic. Nevertheless, any noise components occuring in the necessary sound frequency region can not be removed by any conventional means. Moreover, no proper countermeasures have been provided to the discontinuity of the pitch frequency components.

Although a reproducing apparatus such as a tape recorder for high speed reproduction could provide wide applications and therefore have been eagerly waited for, such apparatus has not been widely used. It is not too much to say that the reason is that the naturalness of the sound quality of the synthesized sound is not sufficient yet even if the contents of the reproduced sound signal are perceptible.

SUMMARY OF THE INVENTION

An analog sound signal the time axis of which is compressed is obtained by reproduction of a recorded sound at a speed higher than that of the recording. The analog sound signal is sampled responsive to a write clock pulse at a predetermined sampling repetition period and is stored in an analog storage. The analog sound signal as stored is then read out responsive to a read clock pulse. In reading the analog sound signal, a portion of each sampling repetition period is discarded and the remaining portion of each sampling repetition period is in succession compiled for the purpose of synthesization of the reproduced sound. A trailing end portion of a preceding sound element and a leading end portion of a succeeding sound element are used for evaluation of a time axis correcting amount for evaluating similarity of these end portions, whereby the joining timing of the preceding sound element and the succeeding sound element is determined. In a preferred embodiment of the present invention, a bucket brigade device is used as an analog storage of a sound signal and a microcomputer is used for evaluation of the above described time axis correcting amount.

According to the present invention, the discontinuity of the waveforms and the pitch frequency components liable to occur at the junctions between a preceding sound element and the succeeding element is effectively avoided. As a result, the sound quality of a reproduced and synthesized sound is much improved as compared with that achieved by any of the prior art approaches.

Therefore, a principal object of the present invention is to provide an improved sound synthesizing apparatus employing an analog shift register switching system.

Another object of the present invention is to provide a sound synthesizing apparatus, wherein the discontinuity of the waveform liable to occur at the junction between a preceding sound element and a succeeding sound element is effectively avoided.

A further object of the present invention is to provide a sound synthesizing apparatus, wherein the discontinuity of the pitch frequency components of the reproduced sound liable to occur at the junction between a preceding sound element and the succeeding sound element is effectively avoided.

Still another object of the present invention is to provide a sound synthesizing apparatus, wherein the joining timing between a preceding sound element and a succeeding sound element is evaluated by the use of a system of a slower compilation speed.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a graph showing the waveforms of a preceding sound element and a succeeding sound element for explaining the operation of the embodiment;

FIG. 12 shows a relation of the sound quality versus the bit number of the analog/digital converter, wherein the abscissa indicates the number of bits of the analog/digital converter and the ordinate indicates the sound quality;

FIGS. 18A and 18B each show sine waves as jointed, wherein FIG. 18A shows that in case of the present invention and FIG. 18B shows that in case of the prior art;

FIGS. 19A and 19B each show frequency spectrum of the 125 Hz sine wave, as jointed, wherein FIG. 19A shows that in the case of the present invention and FIG. 19B shows that in the case of the prior art;

FIGS. 20A and 20B show examples of the junction of the waveforms of the adjacent sound elements with respect to a vowel sound "i", wherein FIG. 20A shows that in the case of the present invention and FIG. 20B shows that in the case of the prior art; and FIG. 21 shows a block diagram of a hardware implementation for executing an operation for similarity evaluation in accordance with the present invention.

DESCRIPTION OF THE PREFERRED EMBODIMENTS

Figure 2:
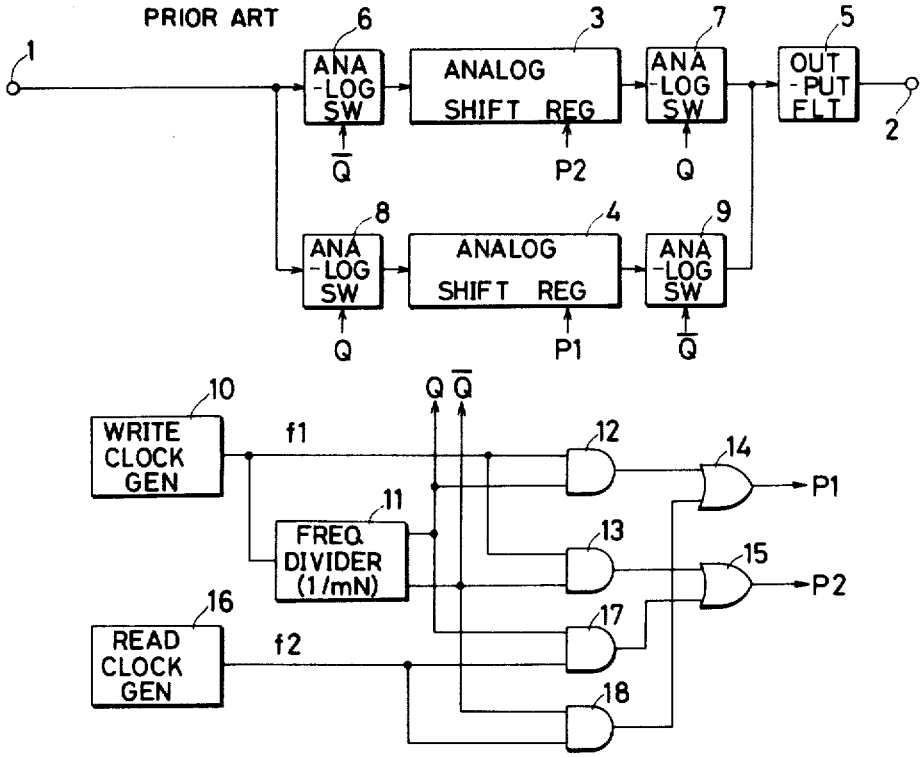
FIG. 2 PRIOR ART
FIG. 2 is a prior art block diagram showing one example of a sound synthesizing apparatus employing an analog shift register switching system which constitutes the background of the invention.
Figure 5:
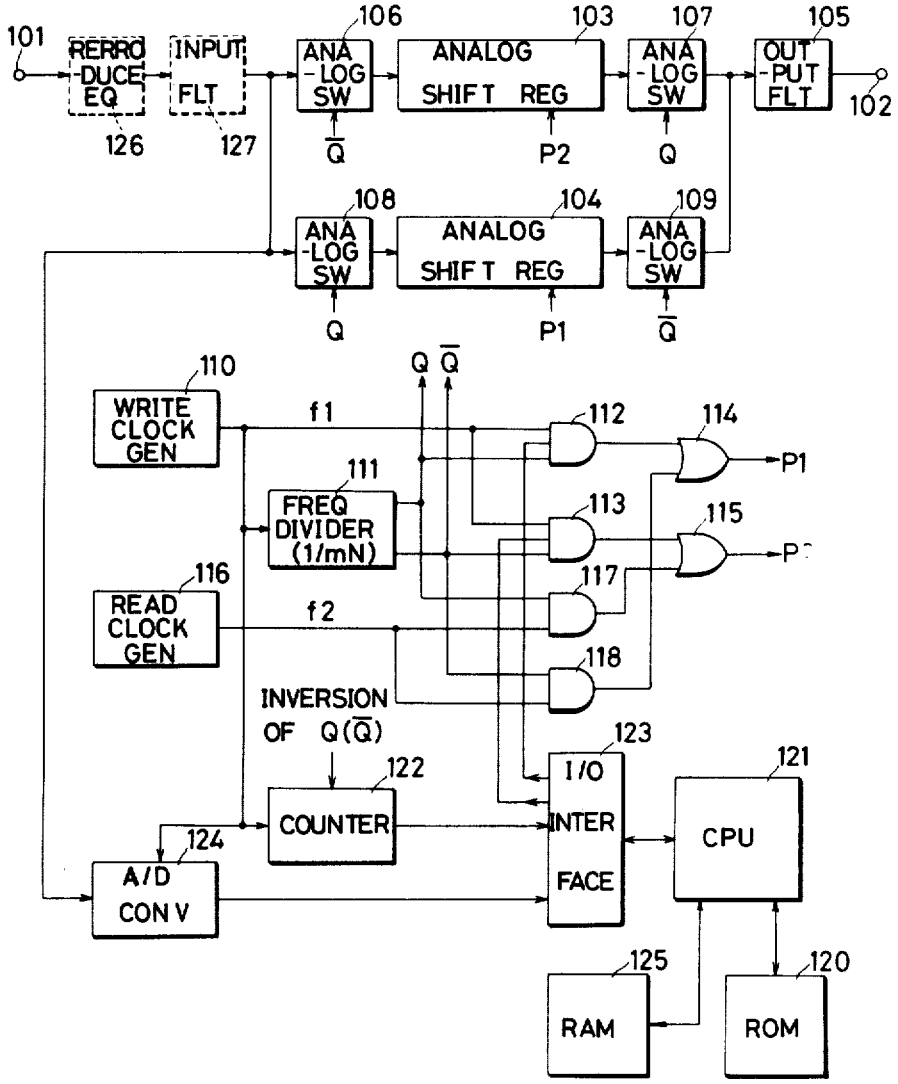
FIG. 5 is a block diagram showing one embodiment of the present invention.

FIG. 5 is a block diagram showing one embodiment of the present invention. Referring to FIG. 5, like portions have been denoted by the corresponding reference characters of 100 order corresponding to those used in the FIG. 2 prior art apparatus. For example, an input terminal 101 corresponds to the input terminal 1 in FIG. 2, an output terminal 102 corresponds to the output terminal 2 in FIG. 2, and so on. The blocks 110 and 116 may be structured to generate clock pulses of different frequencies by means of frequency dividers of different frequency division rates structured to receive a common master clock. The analog shift registers 103 and 104 also may be implemented by charge coupled devices and any other type of analog memories, besides bucket brigade devices to be described subsequently. It is further pointed out that the analog shift registers 103 and 104 need not be necessarily implemented by analog memories but may comprise digital memories such as shift registers, random-access memories or the like. In the latter mentioned embodiment, however, analog/digital converters must be provided at the input of the digital memories and digital/analog converters must be provided at the output of the digital memories and an addressing circuit need be provided coupled to the digital memories. Employment of the digital memories could dispense with an analog/digital converter 124 to be described subsequently. Although an external circuit for specifying the reproduction speed ratio m is not shown, preferably the circuit is structured such that the reproduction speed ratio m can be adjustably specified to be continuously or stepwide variable. It is pointed out that if and when the reproduction speed ratio m is selectively adjusted, it is necessary to vary at the same time both the speed of a driving motor, not shown, for driving a tape transfer mechanism and the frequency f1 of the write clock signal. To that end, a motor control circuit comprises a rotation speed control scheme. The write clock generator 110 is adapted such that the frequency thereof is varied responsive to a control signal obtainable from an external circuit, not shown, for specifying the reproduction speed ratio m. To that end, the write clock generator 110 may comprise a programmable frequency divider. Alternatively, the write clock generator 110 may comprise a variable frequency oscillator, such as a voltage controlled oscillator. The frequency divider 111 may comprise a programmable frequency divider the frequency division rate 1/mN of which is variable as a function of the reproduction speed ratio m. Although not shown, preferably a circuit for detecting selective adjustment of the reproduction speed ratio m is provided for allowing the resetting of the operation of the microprocessor 121 in response to the detected output. The write clock generator 110 is preferably adapted to be synchronized with the rotation of the above described driving motor, not shown. To that end, the write clock generator 110 may comprise a pulse generator operatively coupled to the driving motor to be operable in synchronism with the rotation of the driving motor. An essential feature of the embodiment shown resides in employment of a microcomputer 121, a read-only memory 120 storing a program associated with the microcomputer 121 and a random-access memory 125 storing various data associated with the microcomputer 121. The analog sound signal the time axis of which is compressed by the factor m received at the input terminal 101 is applied to analog/digital converter 124. The analog/digital converter 124 is responsive to the clock pulses of the frequency f1 from the write clock generator 110 to sample the analog sound signal as a function of the clock pulses to convert the same into a digital code. The clock pulse from the write clock generator 110 is also applied to the counter 122. The counter 122 is supplied with and is enabled by the Q output of the frequency divider 111. The output of the counter 122 and the output of the analog/digital converter 124 are applied to the microcomputer 121 through a input/output port or input/output interface 123. Control commands from the microcomputer 121 are applied to the AND gates 112 and 113 through the input/output interface 123. These circuit components will be described in more detail in the following.

The embodiment shown has been designed such that a reproduced sound frequency band is 100 Hz to 6 kHz, a reproduction speed ratio m can be set to 1, 1.5, 1.8, 2.0, 2.3, and 2.7, and a signal to noise ratio of the reproduced sound signal exceeds 50 dB.

Figure 7:
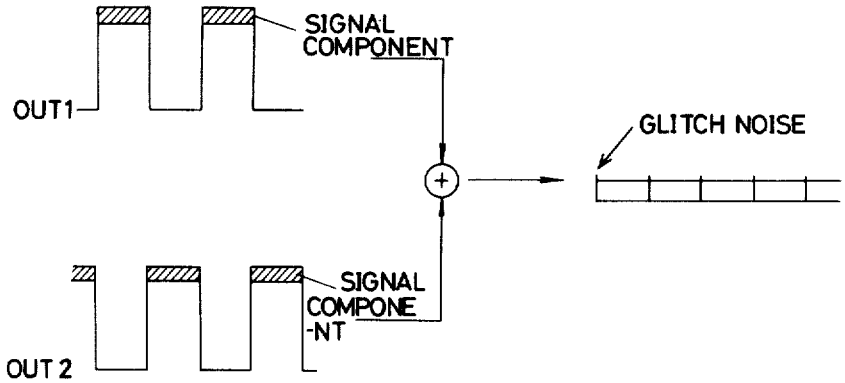
FIG. 7 is a diagram for explaining a synthesized signal of the outputs from the analog shift registers.
Figure 3:
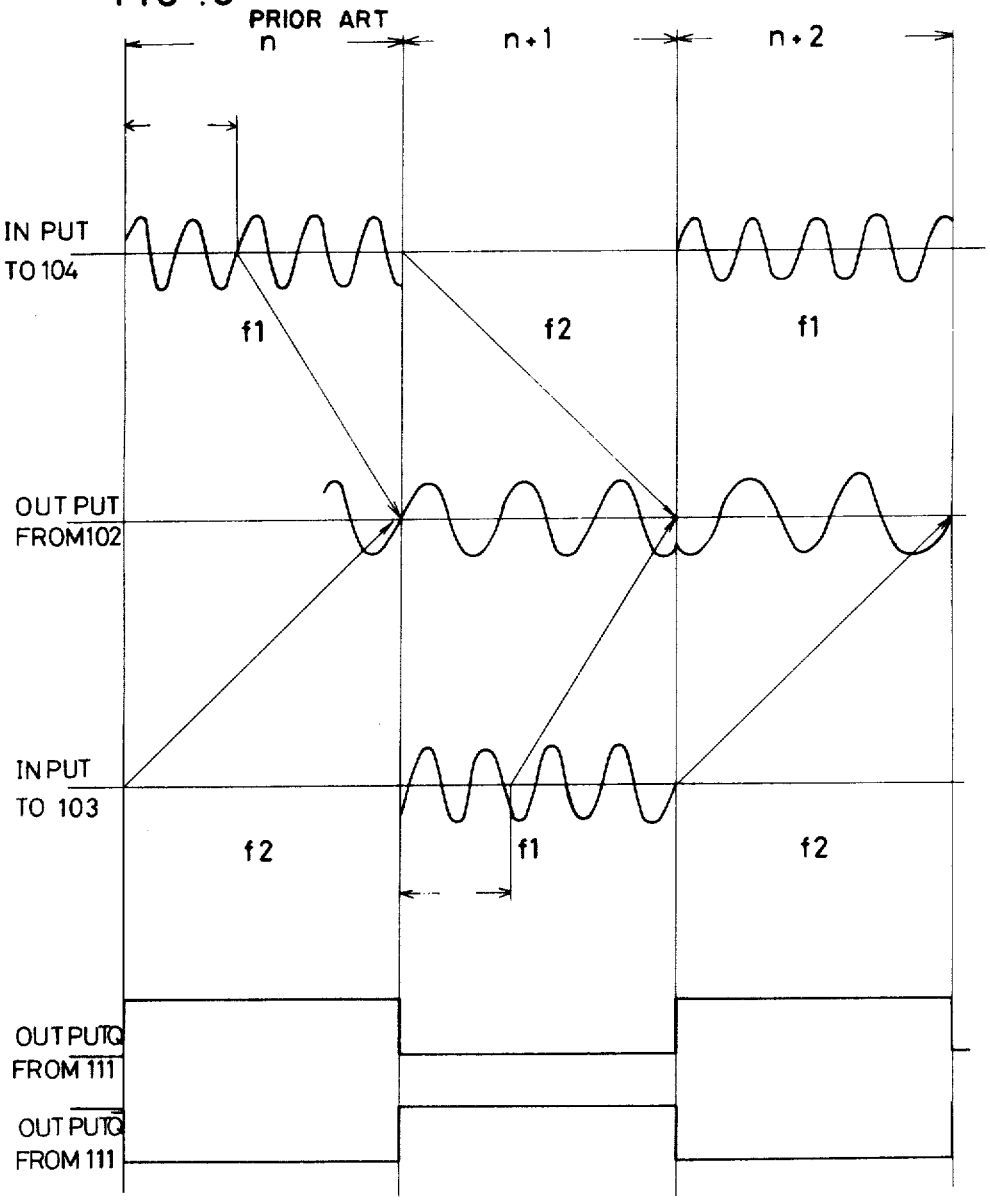
FIG. 3 PRIOR ART
FIG. 3 is a prior art timing charge of waveforms of a sound signal for explaining the operation of a sound synthesizing apparatus employing an analog shift register switching system.
Figure 6:
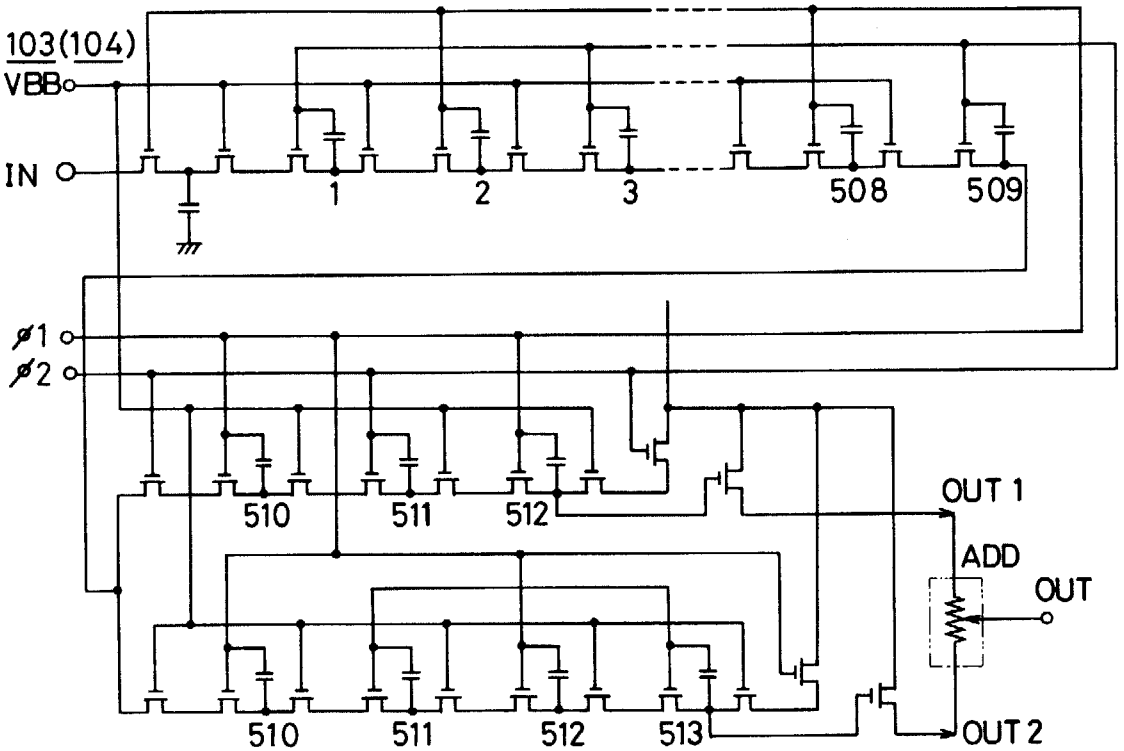
FIG. 6 is a schematic diagram showing in detail an analog shift register employing a bucket brigade device.

The embodiment shown is further structured using bucket brigade devices as the analog shift registers 103 and 104. As a bucket brigade device, model SAD 1024 manufactured by Reticon Incorporated, United States, was used. A bucket brigade device may be considered as a series connected capacitor device, wherein analog information is stored by way of an electric charge and is transferred in succession as a function of a clock pulse by every second cell, as shown in FIG. 6 in detail. It should be noted that the number of bits of the analog information that can be stored and transferred in a bucket brigade device is a half of the number of capacitor cells serving as storage elements. In case of the above described model SAD 1024, the number of storage elements is 1024, wherein the number of storing bits N is 512, the device being operable responsive to 2-phase clock signals $\phi 1$ and $\phi 2$. As seen from FIG. 6, the device has two output terminals, which are withdrawn from the storage elements or memory cells at the 512th and 513th stages. The purpose of this type of withdrawal of the outputs is to considerably reduce a large clock signal component, even if such is included in the output signal, by withdrawing the output signal in a differential manner, whereby a low pass filter 105 connected in the subsequent stage of the analog shift registers 103 and 104 is less loaded. More specifically, the above described two output signals both have extremely large clock signal components as well as necessary analog information. However, both also have a time difference of half of the sampling cycle. Therefore, mere synthesization of both output signals causes elimination of the clock signal components, as shown in FIG. 7, with the result that only the analog information is obtained while the clock signal components disappear. Since the output circuits may be implemented in substantially the same sides on the same chip, mere synthesization of the above described two output signals considerably reduces the clock signal components. However, a slight difference arises between the two outputs by virtue of a transient phenomenon, which difference output remains as a clock signal component, without becoming zero, which assumes a spike waveform, as shown in FIG. 7. The above described residual spike component is referred to as a glitch noise. Since this type of component is very small, the same can be completely removed by a low pass filter 105 in the subsequent stage. The bucket brigade devices used as the analog shift registers 103 and 104 can contain the electric charge, without a substantial leakage of the electric charge from the memory celles, even if the clock pulse is terminated. In case of the model SAD 1024, the attenuation of the electric charge or the signal for termination of the clock pulse for 100 msec at a temperature 25° C. is approximately −40 dB.

Figure 8:
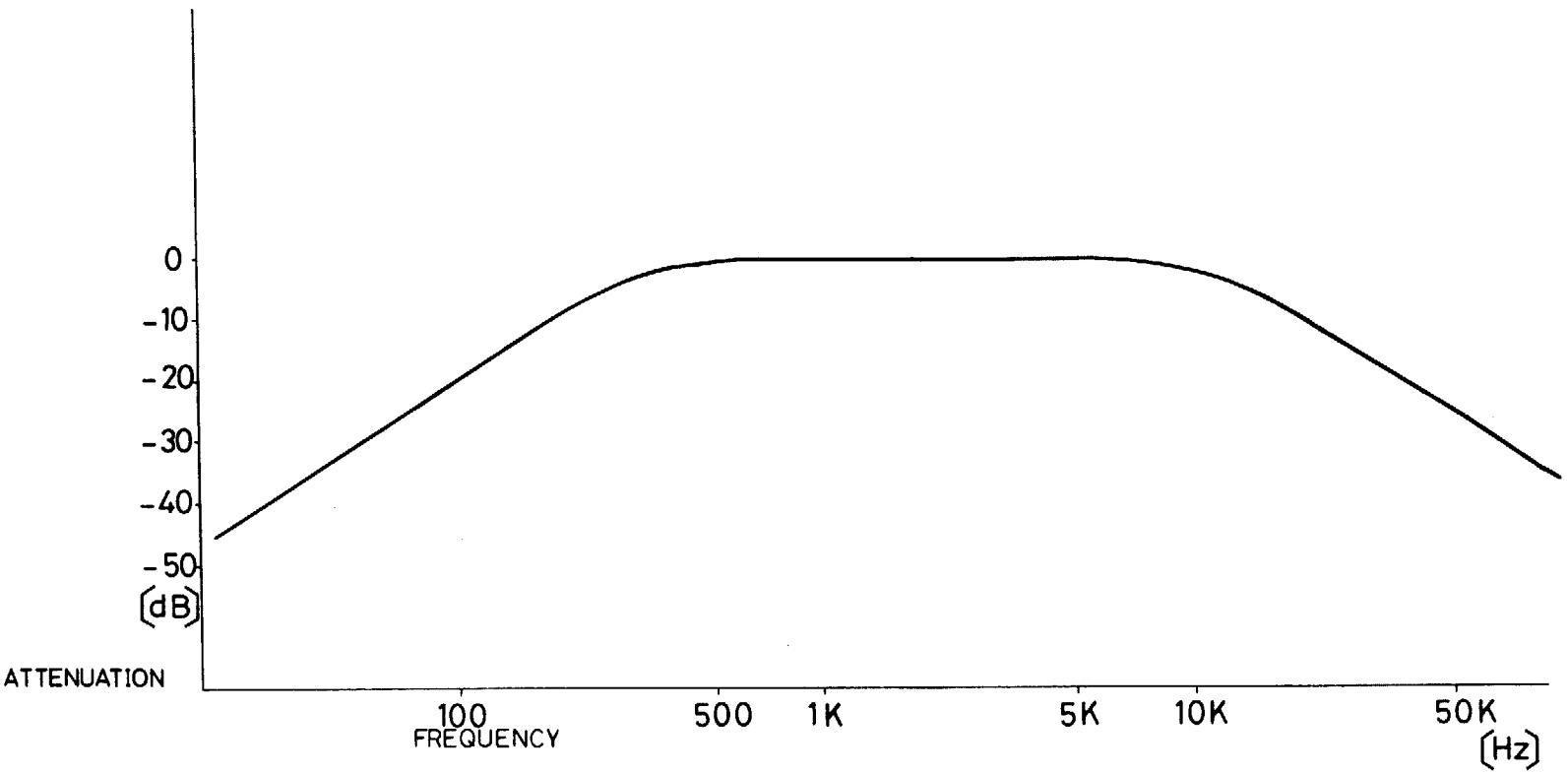
FIG. 8 is a graph showing an example of a frequency characteristic of an input filter.

Between the analog switches 106 and 108 and the input terminal 101, a reproducing equalizer 126 and input filter 127 may be provided, as shown by the dotted line in FIG. 5. The input filter 127 is often used in this type of time sampling processing circuit as a so-called aliasing filter for the purpose of preventing a difference component between the clock signal component of 20 kHz and the signal component from being mixed in a reproduced sound frequency band. The frequency characteristic of the input filter 127 is shown in FIG. 8. The frequency band of the input analog sound signal is variable as a function of a ratio of reproduction speed to recording speed as a matter of course. Accordingly, the frequency characteristic of the filter 127 should be preferably changed depending on the reproduction speed ratio. However, for the purpose of an inexpensive implementation, the filter frequency characteristic is selected to be optimum on the occasion of the reproduction speed ratio m=2.0. Even in such a case, a sufficient increase of a sampling frequency has little effect on the deterioration of the sound quality on the occasion of the reproduction speed ratio m being other than 2.0.

Since the travel of a magnetic tape is considerably changeable at the high speed reproduction, the frequency characteristic of a reproduced signal obtained from an equalizer amplifier set to a normal tape speed is also considerably changeable. A tendency is seen that the level of the signal from a reproducing head, not shown, increases at 6 dB/octave in proportion to the frequency and a further increase of the signal frequency decreases the level by virtue of various losses. Therefore, it is required that a reproducing preamplifier connected to the reproducing head be implemented by an equalizer for compensating the frequency characteristic. The reproducing equalizer 126 as shown in FIG. 5 includes level and frequency compensating circuits and serves to achieve level adjustment for effectively using the dynamic range of the analog shift registers 103 and 104.

Figure 9:
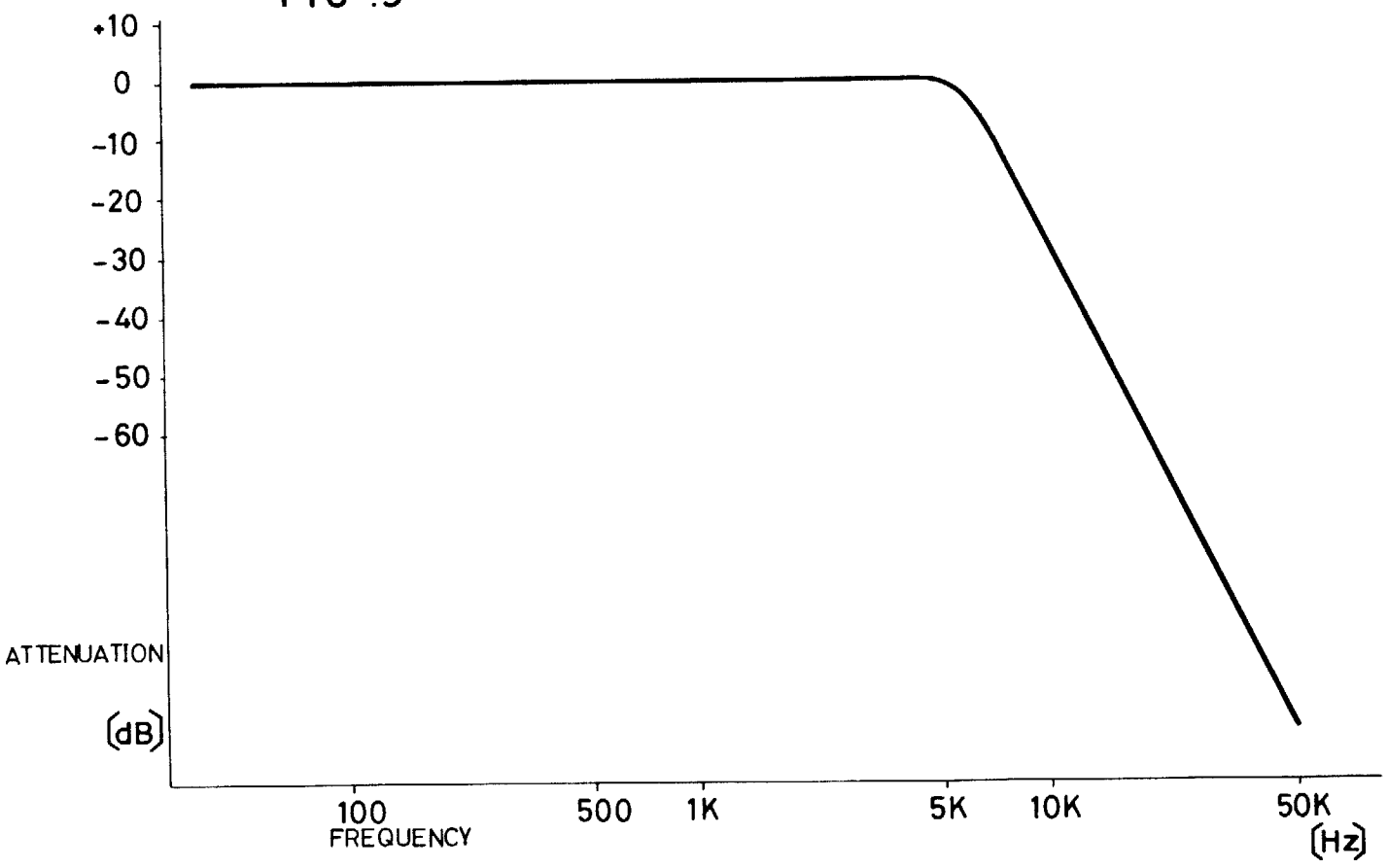
FIG. 9 is a graph showing an example of a frequency characteristic of an output filter.

The frequency characteristic of the output filter, i.e. a low pass filter 105, is shown in FIG. 9. It is necessary that the frequency f2 of the read clock pulse be set to be higher than two times the necessary reproduction frequency band, such as 6 kHz theoretically from the sampling principle, and if a signal to noise ratio in the higher frequency region should be desirably ensured, the frequency f2 of a read clock pulse should be set as high as possible. In the embodiment shown, the frequency f2 of the read clock pulse is 20 kHz and the component of 20 kHz is suppressed to smaller than −60 dB by the low pass filter 105, as seen in FIG. 9.

The microcomputer as the central processing unit 121 may be model F-8:3850 manufactured by Fairchild Camera & Instrument Corporation, U.S.A. The counter 122 is used to count the write clock pulses at the leading end portion and the trailing end portion of the sound elements at each sampling cycle for indicating a timing to the microcomputer 121 through the inout/output interface 123. The analog/digital converter 124 receives the clock pulses from the write clock generator 110 as a convert command signal to convert the analog sound signal applied to the input terminal 101 the time axis of which has been compressed into a digital format. The random-access memory 125 coupled to the microcomputer 121 serves to store the signal converted into a digital format by means of the analog/digital converter 124 and also tentatively store the result of computation by the microcomputer 121.

Figure 11:
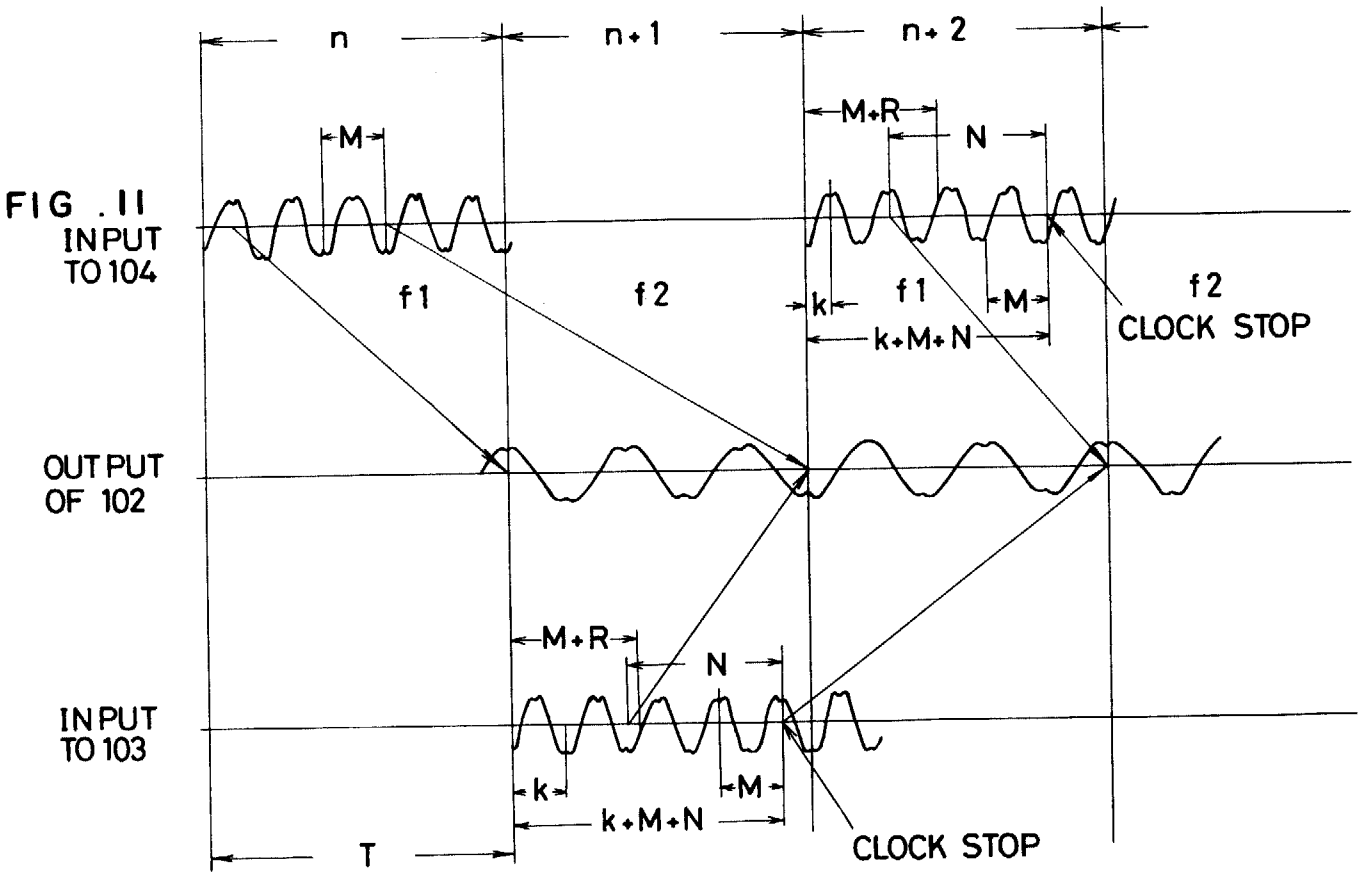
FIG. 11 is a timing chart for explaining the operation of the embodiment.

FIG. 10 shows waveforms for explaining the operation of the embodiment shown and FIG. 11 shows a timing chart. Referring to FIGS. 10 and 11, the reproduced sound signal to be outputted during the (n+1)th period has been loaded in the analog shift register 104 during the n-th period and the reproduced sound signal to be outputted during the (n+2)th period following the above described sound element is loaded in the analog shift register 103 during the (n+1)th period. The signal component at the trailing end portion of the sound element loaded during the n-th period is stored in the random-access memory 125 during the said period of time and the signal being loaded in the analog shift register 103 during the (n+1)th period is monitored, to find a timing point in the signal of the data loaded in the analog shift register 103 which most suitably connects with the signal of the data stored in the analog shift register 104, whereupon the above described timing point is used as a starting point of the following (n+2)th period through suitable control of the clock pulses to be applied to the analog shift registers 103 and 104. Then, the discontinuity of the waveform and variation of the pitch frequency are suppressed with respect to the reproduced sound signal obtained from the output terminal 102 the time axis of which is once compressed and then returned to the original.

In order to seek the above described timing point, similarity between the trailing end portion of a preceding sound element and the leading end portion of a succeeding sound element, as shown in FIG. 10, is evaluated. By way of a specific approach to evaluate the above described similarity, a square error of the two waveforms may be evaluated.

Assuming that the sample train of the trailing end portion of a preceding sound element is $X_p(p=1,2,\ldots M)$ and the sample train of the leading end of a succeeding sound element is $Y_p(p=1,2,\ldots M+R)$, then the square error between these two waveforms is expressed by the following equation.

$$e_k^2 = \frac{1}{M}\sum_{p=1}^{M}\left(\frac{X_p-\overline{X}}{\sigma_X}-\frac{Y_{p+k}-\overline{Y}}{\sigma_Y}\right)^2 \tag{2}$$

where $\overline{X}$ and $\overline{Y}$ are means values and $\sigma_x$ and $_y$ are standard deviations and are expressed by the following equations:

$$\overline{X} = \frac{1}{M}\sum_{p=1}^{M} X_p \tag{3}$$

$$\overline{Y} = \frac{1}{M}\sum_{p=1}^{M} Y_p \tag{4}$$

$$\sigma_X = \sqrt{\frac{1}{M}\sum_{p=1}^{M}(X_p-\overline{X})^2} \tag{5}$$

-continued $$\sigma_Y = \sqrt{\frac{1}{M}\sum_{p=1}^{M}(Y_p-\overline{Y})^2} \tag{6}$$

where k=0, 1, 2, . . . R.

The mean square error is representative of the similarity of the sampled waveform $X_p$ and the sampled waveform $Y_p$ when the waveform $Y_p$ is shifted with respect to the sampled waveform $X_p$ by k sampling points for super position thereof and the microcomputer 121 is adapted to compute the above described mean square error $e_k^2$ in each of the cases where k=0,1,2, . . . R, whereby the value k where the mean square error becomes minimum is determined. In other words, as shown in FIG. 10, it is seen that the train of M samples at the trailing end portion of a preceding sound element should be superposed to the leading end portion of a succeeding sound element such that the sample train of the trailing end portion of the preceding sound element is shifted by the number of k samples from the leading end portion of the succeeding sound element to bring about a minimum mean square error.

In order to achieve the above described computation, the microcomputer 121 is responsive to the output of the counter 122 counting the write clock pulse to effect analog/digital conversion of the sampled data at both the M sample points at the trailing end portion in the n-th period and at the M+R (M+R) sample points from the leading end of the following (n+1)th period, shown in the FIG. 11 timing chart, whereupon the outputs are loaded in a digital signal form in the random-access memory 125 being controlled by the microcomputer 121. Thereafter, the microcomputer 121 is adapted to execute computation of the above described equation (2) with respect to the M samples in the trailing end portion of the preceding sound element and the (M+R) samples in the leading end portion of the succeeding sound element. Thus, the value k is determined wherein the mean square error $e_k^2$ becomes minimum. In other words, it follows that the train of the M samples at the trailing end portion of the preceding sound element should be superposed to the leading end portion of the succeeding sound element such that the train of the M samples in the trailing end portion is shifted from the leading end portion of the succeeding sound element by the number of k in terms of the number of samples to provide the minimum mean square error. Therefore, the microcomputer 121 is controlled such that the AND gate 113 is controlled at the (k+M+N)th clock pulse from the leading end of the succeeding sound element so that the write clock pulse to the analog shift register 103 is stopped. Since the capacity of the analog shift registers is N bit, the N bit samples starting from the (k+M+1)th from the leading end of the analog shift registers are loaded and are read out sequentially during the (n+2)th period of time. In such a situation, the M samples at the trailing end portion of the samples obtained during the n-th period and the M samples starting from the (k+1)th sample of the succeeding sound element loaded during the same period are superposed with the minimum error, as understood from the foregoing description, with the result that the sound element is withdrawn totally in a natural form from the (n+1)th period to the (n+2)th period. Thus, neither any discontinuity of the waveforms nor any discontinuity of the pitch frequency occurs. Out of the N samples loaded in the analog shift registers during the following (n+1)th period, the M samples at the trailing end portion are similarly converted into a digital signal by means of the analog/digital converter and is stored in the memory 125 of the microcomputer 121, because the same is required to evaluate the similarity with the train of (M+R) samples at the leading end portion loaded in the following (n+2)th period. A point is that the analog shift registers 103 and 104 each comprise N bit, so that even if the samples of the bit number (k+M+N) exceeding the above described bit number of N are loaded, only the N bit samples from the trailing end are finally stored.

Thus, the two waveforms are normalized by a square mean value or a standard deviation, whereby any influence by virtue of the difference in amplitude is removed, while a sum of square of the difference therebetween is evaluated by shifting one waveform with respect to the other on a bit by bit basis in terms of the time axis. However, the above described computation by means of the microcomputer 121 must be effected within the following processing cycle period. More specifically, the computation by means of the microcomputer 121 must be initiated after the leading end sample among the (M+R) samples is loaded and must be completed by the (k+M+N)th clock pulse. Accordingly, the time period tc available for such processing is expressed by the following equation.

$$tc = \frac{1}{f1}\{(K + M + N) - (M + R)\} = \frac{(N + k - R)}{f1} \quad (7)$$

The shift amount k for correction of the time axis is $0 \leqq k \leqq R$ and the minimum time period to(min) available for processing is expressed by the following equation.

$$tc(\min) = \frac{N - R}{f1} \quad (8)$$

where the number of samples M being loaded must contain that commensurate with one wave length in terms of the fundamental pitch frequency, at the least. It is considered that the maximum correction amount R for junction of the adjacent sound elements must also be substantially the same. Accordingly, assuming that the fundamental frequency is 200 Hz, the length being taken in terms of the reproduction in 5 msec, and the frequency f2 of the read clock pulse is 20 kHz, then the number of data samples being taken is $20\times10^3\times5\times10^{-3}=100$. The maximum value of the frequency f1 of the write clock pulse is given as f1 (max)$=2.7\times20$ kHz$=54$ kHz, in case where the reproduction speed ratio m=2.7. In such a situation, the value M is substantially equal to the value R and accordingly the minimum processing time period tc(min) is 7.63 msec from the above described equation (8).

The purpose of taking the sample data at the leading end portion of a sound element is to evaluate the similarity of the waveform and therefore it is not necessarily required to take the data at all the sampling points of the sampling number M. Therefore, in a practical apparatus, a frequency divider of the factor 4 or 6, not shown, is provided between the write clock generator 110 and the counter 122, so that the data is sampled at every sixth sampling point, although the above described factor 4 or 6 may be increased or decreased. According to such modification, the number of samples can be decreased and the capacity of the memory 125 can also be decreased and accordingly the time period for data processing by the microcomputer 121 can also be decreased. Since the above described taking pitch i.e. the frequency division rate by the above described frequency divider, not shown, causes an error at a junction point of the adjacent sound elements, the above described taking pitch or the frequency division rate can not be increased too much.

The time period of each sound element is as long as several tens msec, at the least, and therefore the above described computation can be readily achieved by means of a microcomputer commercially available of late. However, in consideration of the capacity of a computer system and economy with respect to the above described available time period, the processing amount should be the irreducible minimum of a requirement, at the least. By way of one example, therefore, the above described equation (2) is rewritten as the following equation.

$$e_k^2 = 2\left(1 - \frac{1}{M\cdot\sigma_X\cdot\sigma_Y}\right)\sum_{p=1}^{M}(X_p - \overline{Y})(Y_{p+k} - \overline{Y}) \quad (9)$$

Furthermore, in order to obtain only the similarity of the waveform, only the second term in the equation (9) may be used. Then, the equation (9) may be further rewritten as the following equation.

$$F_{XY}(k) = \frac{1}{M\cdot\sigma_X\cdot\sigma_Y}\sum_{p=1}^{M}(X_p - \overline{X})(Y_{p+k} - \overline{Y}) \quad (10)$$

The term $F_{XY}(k)$ defined in the equation (10) is referred to as a cross-correlation function between two numerical value series $X_p$ and $Y_p$, as well-known, which is a power between two waveforms in case where one waveform is shifted with respect to the other by k sample values, which assumes unity when two waves completely coincide with each other. If such a cross-correlation function is evaluated, then the computation processing time by the microcomputer 121 is considerably reduced.

From the equation (2), since the two adjacent sound elements being jointed are those close to each other in terms of time and hence both the amplitude and the level of these sound elements may be deemed close and similar to each other and thus both the mean value and the standard deviation of these sound elements may be close and similar to each other. Therefore, the above described equation (2) may be rewritten as follows:

$$e_k^2 = \frac{1}{M}\sum_{p=1}^{M}(X_p - Y_{p+k})^2 \quad (11)$$

An important point to the present invention is that a timing point where the two waveforms most resemble is to be thought. Therefore, the equation (11) may be rewritten as follows:

$$e_k = \sum_{p-1}^{M}|X_p - Y_{p+k}| \quad (12)$$

where $X_p$ and $Y_{p+k}$ are data at the most significant bit position obtainable from the analog/digital converter 124 and hence assumes the logic one or zero. More specifically, the equation (12) represents an integration of the absolute value of the difference between the respective corresponding sampled values and the junction timing point is determined by evaluating the shift amount k where the value $e_k$ becomes minimum. More specifically, the microcomputer 121 is adapted to execute computation of the equation (12) with respect to each of the case where k=0, 1, . . . R, whereupon the value k for minimizing the value $e_k$ is determined.

Figure 15:
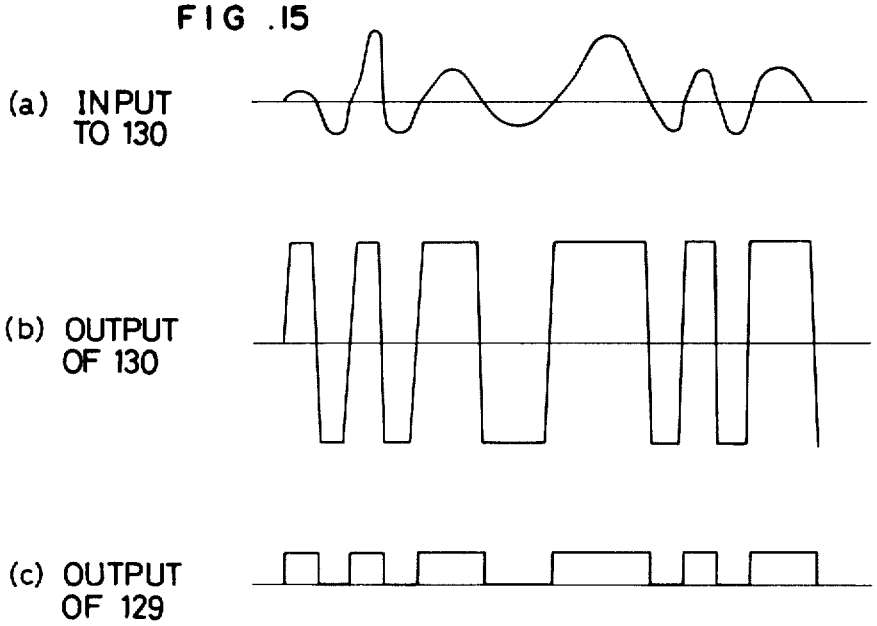
FIG. 15 shows waveforms at various portions in the FIG. 14 embodiment.

The reason why only the most significant bit of the output from the analog/digital converter 124 is utilized will be described. Eash sound element is as short as several tens to several hundreds msec and at least a jointing portion of each of the adjacent sound elements is supposed to contain some similarity of the waveform and therefore variation of the pitch frequency of the sound can be suppressed by jointing the adjacent sound elements with the least error of the zero crossing point of the fundamental waveform of the sound signal. Therefore, it is seen that making the waveform of the input sound signal into two-value as shown in FIG. 15 (b) by noting only the phase relation of the input sound signal and using all the digits of the output from the analog/digital converter 124 by means of the microcomputer 121 do not make much difference.

The conversion speed of the analog/digital converter 124 does not exceed the sampling frequency of the analog shift registers 103 and 104. Assuming a reproduction speed ratio m=2.7, then the frequency f1 of the write clock pulse is 54 kHz. However, if the input of the microcomputer 121 is selected at every fourth or sixth clock pulse, by means of a frequency divider, not shown, then the conversion speed need be 13.5 kHz, at the highest. This means that the analog/digital converter 124 must be of relatively high speed type. Although the amplitude level of the sound signal varies continuously, the same is sampled at predetermined level intervals and is converted into a digital value and therefore some error occurs as a matter of course. Accordingly, the larger the bit number of the analog/digital converter 124, the more accurate the digitalization is achieved. However, generally the higher the speed of the analog/digital converter and the larger the bit number of the analog/digital converter, the higher the cost of the analog/digital converter.

In consideration of the foregoing, the inventors of the present invention made experimentation to determine an influence of the bit number of the analog/digital converter 124 upon the sound quality and obtained the data shown in FIG. 12, which shows a relation of the sound quality versus the bit number of the analog/digital converter, wherein the abscissa indicates the number of bits of the analog/digital converter and the ordinate indicates the sound quality. Referring to FIG. 12, if the bit number of the output of the analog/digital converter 124 exceeds 4, substantially the same good quality of sound is achieved irrespective of the number of bits, while the bit number is smaller than three, the sound quality becomes abruptly poor. However, even in case where the bit number is smaller than three, an increase of the sample length M considerably improves the sound quality.

Figure 13:
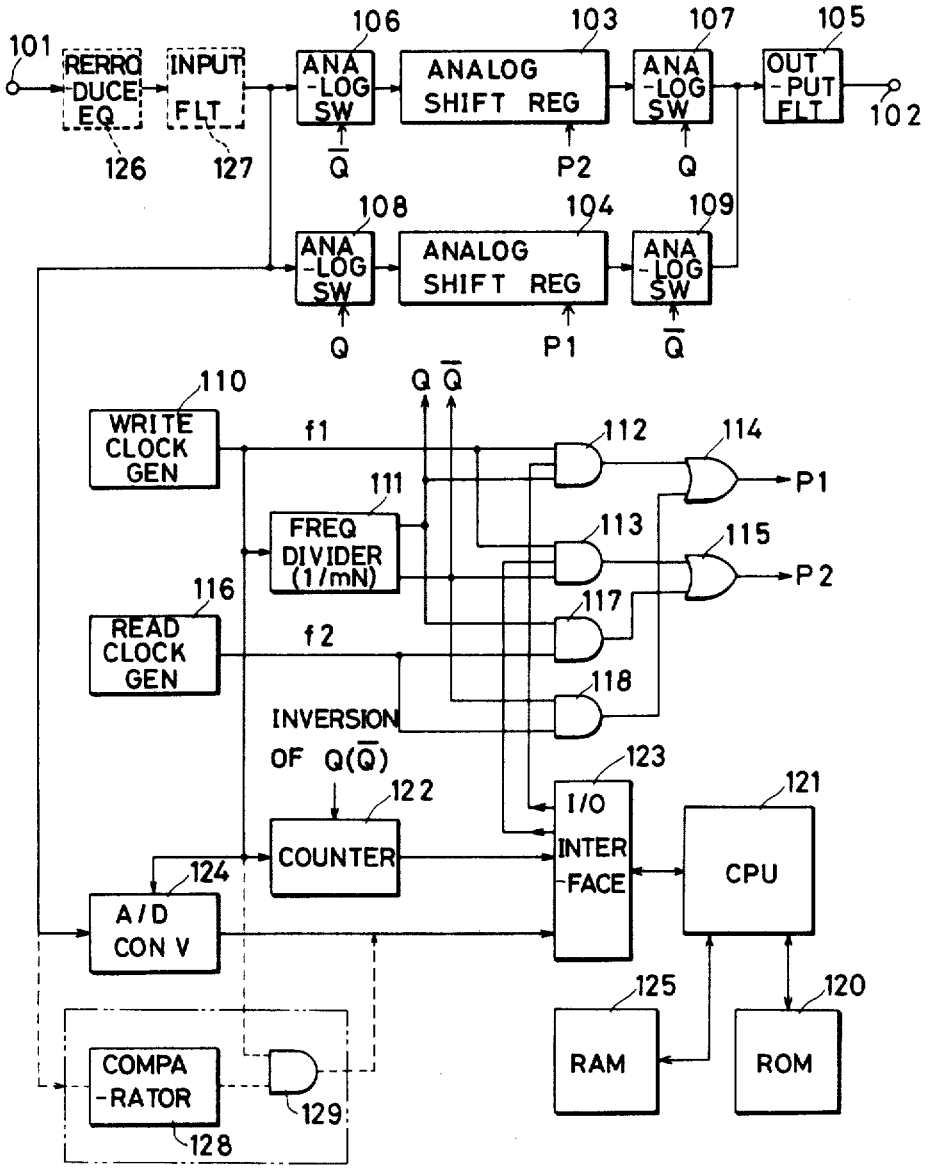
FIG. 13 is a block diagram of another embodiment of the present invention, wherein a comparator has been substituted for the analog/digital converter in the FIG. 5 embodiment.

Patternization of the input waveform only by the use of the most significant bit of the output from the analog digital converter 124 wherein the output is obtained in terms of a straight binary code means that the output of the logic one or zero is outputted in synchronism with a convert command signal or a write clock pulse depending on whether the input waveform exceeds a bias level which is a zero point of the alternating current. Referring to FIG. 13, which shows a block diagram of another embodiment of the present invention, the same function can be achieved by evaluating the logical product of or by ANDing the output of a comparator 128 and a convert command signal or a write clock pulse, as shown in FIG. 13. Accordingly, an AND gate 129 shown in FIG. 13 provides the same digital data as in case where the number of bits of the output of the analog/digital converter 124 is unity.

Figure 14:
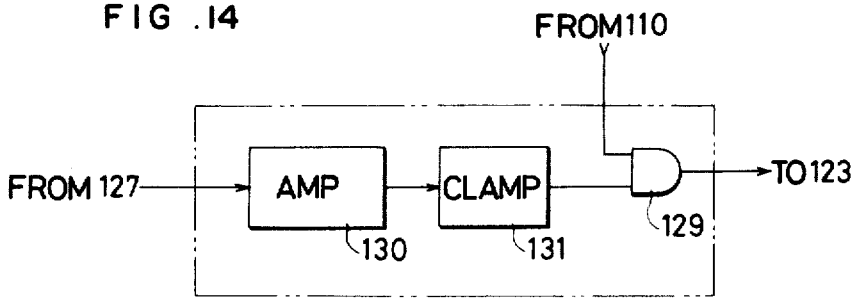
FIG. 14 is a block diagram of a combination of an amplifier, a clamp circuit and an AND gate which can be substituted for the analog/digital converter.

The same function as a case where the analog/digital converter 124 comprises only one bit can also be attained by saturating the amplitude of the signal by an amplifier, whereupon the polarity is determined, and by evaluating the logical product of or ANDing the polarity determined output and the convert command signal. FIG. 14 shows a block diagram of such embodiment. Referring to FIG. 14, the reference numeral 130 denotes an amplifier having a sufficiently large gain, and the reference numeral 131 denotes a clamp circuit. Assuming that an analog sound signal as shown in FIG. 15 (a) is inputted to the input terminal 101, then the input signal is amplified by the amplifier 130 to a saturated form, whereby the output of the waveform shown in FIG. 15 (b) is obtained from the amplifier 130. The output is further clamped at the lower end, or the upper end, of the signal by means of the clamp circuit 131. As a result, the output of the waveform as shown in FIG. 15 (c) is obtained from the clamp circuit 131. The output from the clamp circuit 131 is applied, together with the convert command signal or the write clock pulse, to the AND gate 129. Accordingly, a digital data signal which is the same as that obtained from a one-bit type analog/digital converter 124 is obtained from the AND gate 129. It is pointed out that when the timing for taking the output of the comparator 128 or the clamp circuit 131 is determined by the microcomputer 121 the AND gate 129 shown in FIGS. 13 and 14 is not necessarily required and hence may be omitted.

Thus, in case of an embodiment wherein only the most significant bit of the analog/digital converter 124 is used, an analog/digital converter of a decreased number of output bits can be used and thus the same function can be achieved even by a comparator or a saturation type amplifier. Accordingly, such an analog/digital converter can be implemented with an inexpensive cost, while the amount of information being processed by the microcomputer 121 is decreased and thus the capacity of the read-only memory 120 and the random-access memory 125 can be decreased.

Figure 16:
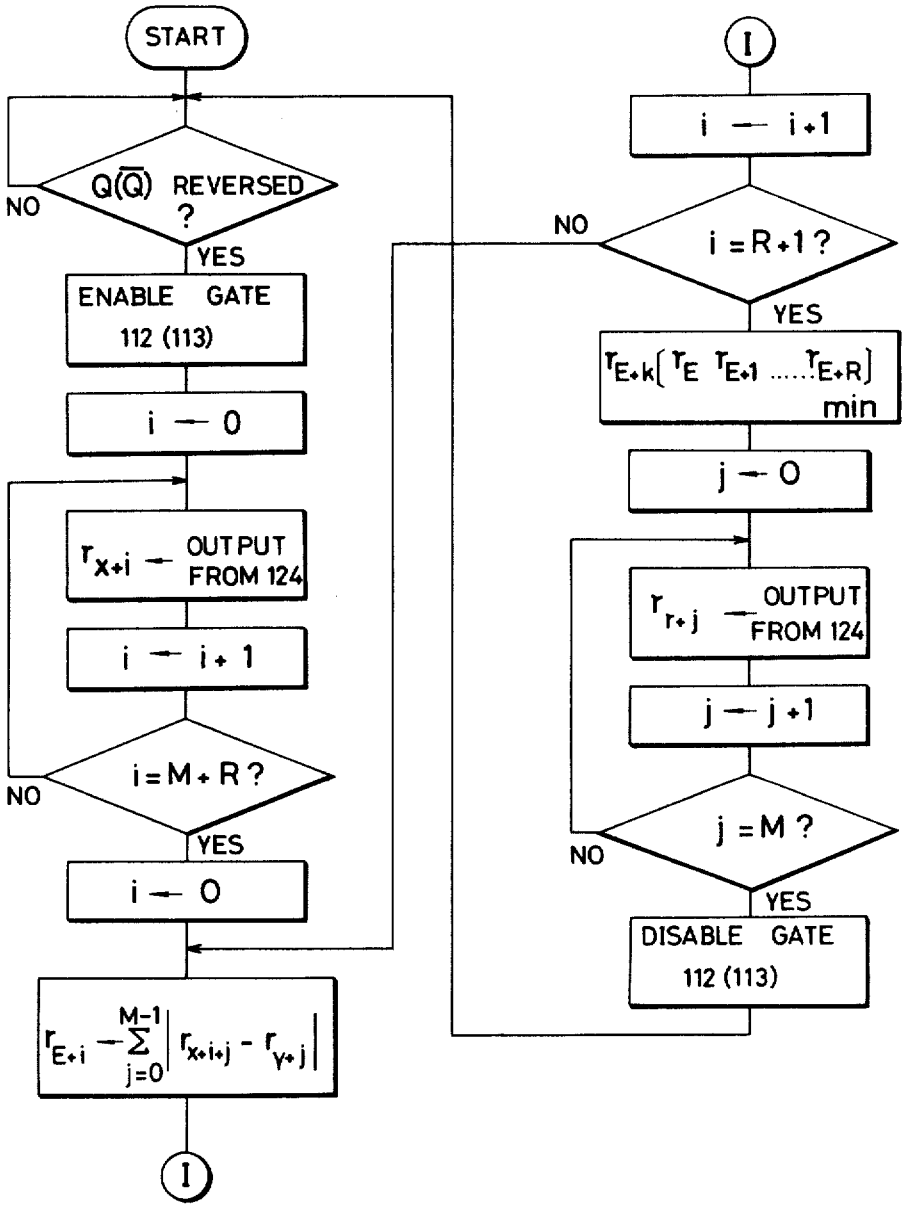
FIG. 16 shows a flow chart for explaining the operation being executed by the microcomputer.

FIG. 16 shows a flow chart for explaining the operation being executed by the microcomputer 121 for evaluation of the shift amount k in accordance with the equation (12). Referring to the flow chart shown in FIG. 16, description will be made of how the above described operation is performed by the microcomputer 121. The microcomputer 121 starts the operation responsive to inversion of the Q or $\overline{Q}$ output of the frequency divider 111. When the Q or $\overline{Q}$ output is reversed, the AND gate 112 or 113 is enable responsive thereto through the input/output interface 123 and the write clock pulse applied to the analog shift register 103 or 104 is rendered effective. At the same time, the counter 122 is reset. Then, the microcomputer 121 serves to reset a particular register, not shown, serving as a counter such as a loop counter, i.e. $i=0$. Thereafter, the output of the analog/digital converter 124 is taken and sequentially loaded in the random-access memory 125, starting from the $r_X$ address. After the data elements of the number $M+R$ are loaded, i.e. the counter 122 counts the number $M+R$, then the samples of the number M previously loaded in the random-access memory 125, starting from the $r_Y$ address, and the above described samples loaded in the random-access memory 125, starting from the $r_X$ address, are subjected to computation for evaluation of the difference between. More specifically, computation in accordance with the following equation (13) is effected with respect to each of the case where $i=0, 1, 2, \ldots, R$, whereupon the result of computation is loaded in succession in the random-access memory 125, starting from the $r_E$ address.

$$\sum_{j=1}^{M} (r_{x+i+j}) - (r_{y+j}) \tag{13}$$

When the evaluated values of the number $R+1(r_E, r_{E+1}, r_{E+2}, \ldots r_R)$ are obtained, then the minimum value among these evaluated values is determined, whereby the shift amount k is determined. In the same manner as described in the foregoing, the samples of the number M following the above described samples are loaded in the random-access memory 125, starting from the $r_y$ address, whereupon the write gate or the AND gate 112 or 113 is closed or disabled.

Figure 17:
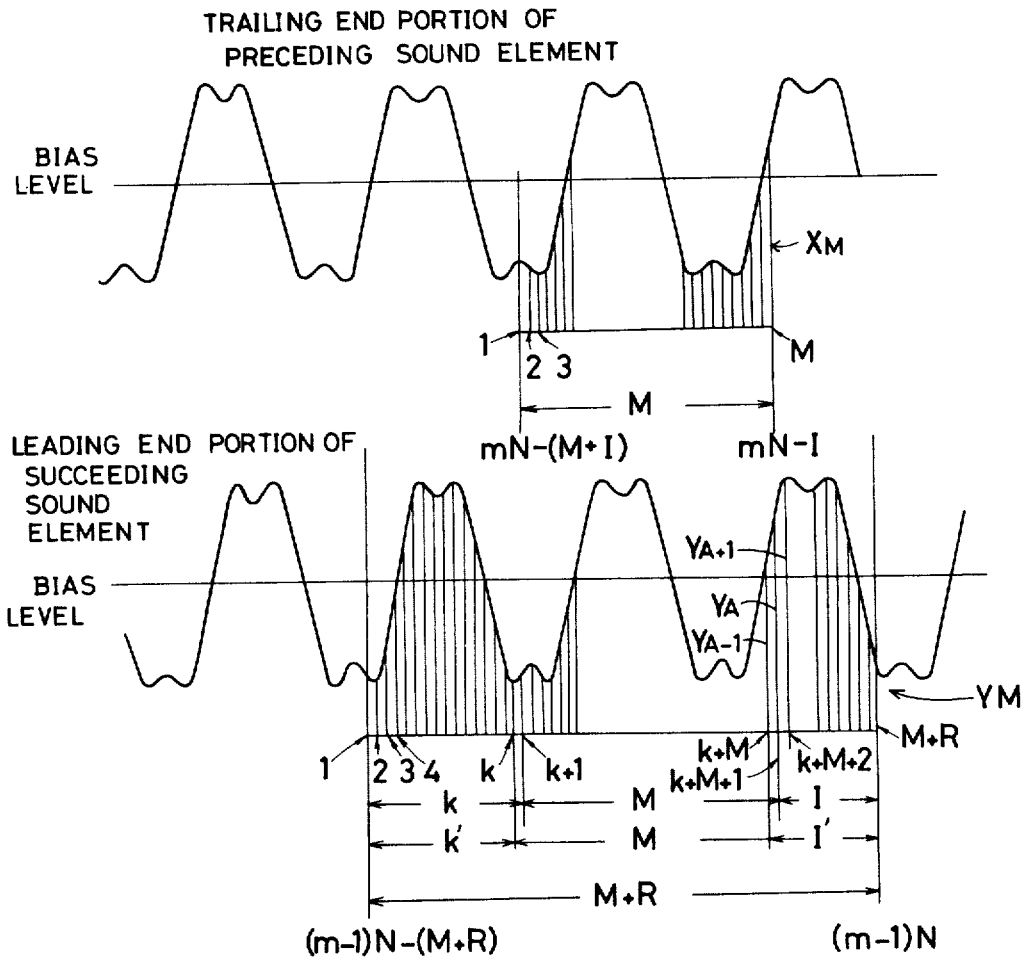
FIG. 17 shows the waveforms in case where the waveform of the leading end portion of a succeeding sound element is of a frequency slightly higher than that of the waveform at the trailing end portion of a preceding sound element.

Now referring to FIG. 17, description will be made of the condition where the write clock pulse is stopped. Since the samples of the number M from the portion shifted by the number k are read out and reproduced as those of the trailing end portion of a preceding sound element, the first sample being read out and reproduced from the succeeding sound element is the sample as shifted by the number $k+M$ from the first one of the train of samples of the number $M+R$ of the succeeding sound element. More specifically, $R+M=K+M+I$. The definition is given as $I=R-k$. Since the capacity of the analog shift registers 103 and 104 is N bit, it follows that the Q output of the frequency divider 111 must stop the write clock pulse during the time period from the time point before a time point where the Q output of the frequency divider 111 is reversed by a period corresponding to the number I of the write clock pulses to the time point where the Q output is reversed, i.e. during the time period corresponding to the last number I of the write clock pulse in each sampling period. Then at the time point where the Q output of the frequency divider 111 is reversed, the analog shift register 103 or 104 has already stored the N bit data from the time point $(m-1)N-I$ and the data is in succession read out from the following read timing point, i.e. the time point where the Q output of the frequency divider 111 is reversed. As is clear from the foregoing description, the samples of the number M at the trailing end portion of a preceding sound element and the samples of the number M starting from the $\{(m-1)N-(M+R)+k+1\}$th sample of the succeeding sound element can overlap each other with the least error. At that time, the number I of the write clock pulses being stopped assumes the number between zero and R. This is clear from the relation $O \leqq k \leqq R$. Generally, the analog shift registers 103 and 104 exhibit a decreased potential at the respective storing bits if and when a write clock pulse is stopped, thereby to cause a noise to a read out and reproduced sound signal by virtue of a variation of a direct current level. However, since the number I of the write clock pulses being stopped has been selected to be the necessary minimum value, the above described noise by virtue of a variation of the direct current level because of a stop of the write clock pulses is suppressed to the minimum.

As described previously, any preceding sound element and the succeeding sound element following the same are contiguous to each other in terms of time and hence the waveforms of the preceding sound element and the succeeding sound element are very similar to each other in terms of the amplitude and the level, as shown in FIG. 10. As seen from FIG. 10, it is with the least error when the train of the samples of the number M at the trailing end portion of a preceding sound element can be superposed to the samples at the leading end portion of the succeeding sound element, starting from the sample shifted by the number k from the beginning of the succeeding sound element. More specifically, after the train of samples of the number M at the trailing end portion of a preceding sound element is reproduced and outputted, a train of the samples at the leading end portion of the succeeding sound element, starting from the $(k+M+2)$th sample from the first of the succeeding sound element, should be reproduced and outputted, in order to achieve an ideal sound synthesizing function in accordance with the present invention. However, the analog sound signal actually inputted is varying from time to time and the waveforms at any preceding sound element and the succeeding sound element are not exactly the same, although the waveforms in the preceding and succeeding sound elements are similar to each other because of time adjacency thereof. By way of an example of such slight difference of the waveforms, FIG. 17 shows a case where the waveform of the leading end portion of a succeeding sound element is of a frequency slightly higher than that of the waveform at the trailing end portion of a preceding sound element. FIG. 17 also shows the value k for minimizing the value $e_k$ defined by the equation (12). As seen from FIG. 17, the samples of the number M at the trailing end portion of a preceding sound element and the samples of the number M, starting from the $(k+1)$th sample from the first one of a succeeding sound element, are slightly different in the pitch frequency. Therefore, the sample value $X_M$ of the final sampling point of the preceding sound element and the sample value $Y_{k+M+1}$ at the $(k+M+1)$th sampling point from the first one of a succeeding sound element are different in the voltage level. Thus, it is preferred to avoid jointing the preceding and succeeding sound elements at a point where the level difference exists between the waveforms of the preceding and succeeding sound elements. Therefore, in the embodiment now under discussion, first the value k for minimizing the value $e_k$ defined by the above described equation (12) is evaluted and then the sample values of several samples in the vicinity of the $(k+M+1)$th sample from the first one of the succeeding sound element, such as three sample values $Y_{k+M}$, $Y_{k+M+1}$ and $Y_{k+M+2}$, are compared with the sample value $X_M$ at the final sampling point of the preceding sound element. Thus, the value k' is evaluated that corresponds to the $(k+M+1)$th sampling point, counting from the first one of the succeeding sound element corresponding to the sample value closest to the sample value $X_M$. More specifically, in accordance with the FIG. 17 embodiment, the sample values $Y_{A-1}$, $Y_A$, $Y_{A+1}$ where $A=k+M+1$ are obtained at the $(k+M)$th, $(k+M+1)$th and $(k+M+2)$th sampling points, counting from the first one of the succeeding sound element obtained by evaluating the value k, and then among these sample values the value closest to the previous sample value $X_M$, is determined i.e. the value k' is evaluated when the ordinal number $(k+M)$ of the sample value $Y_{A-1}$ counting from the first one is deemed as the $(k'+M+1)$th. Then, $k+M=k'+M+1$ and thus $k'=k-1$.

Employment of the shift amount k' thus evaluated in the manner described above enables superposition of the train of the samples of the number M at the trailing end portion of the preceding sound element with the train of the samples at the leading end portion of the succeeding sound element, starting from the sample as shifted by the number k' from the first one of the leading end portion of the succeeding sound element, with the least error. Therefore, the microcomputer 121 is adapted to control the AND gates 112 and 113 such that the samples of the number $(k'+M+N)$ starting from the first one of the leading end portion of the succeeding sound element whereupon the write clock pulse is stopped. Since the analog shift registers 103 and 104 contain the capacity of N-bits, the analog memory stores the N bit data starting from the $(k'+M+1)$th sample, as shown in FIG. 17 and the same is in succession read out in the following period. In such a situation, the samples of the number M at the end of the trailing end portion of the preceding sound element and the samples of the number M, starting from the $(k'+1)$th sample of the leading end portion of the succeeding sound element are superposed with the least error.

Figure 18A:
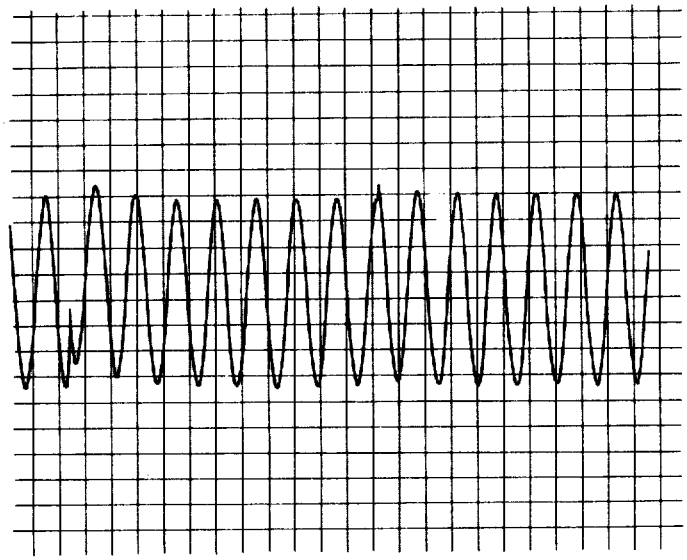
Figure 18B:
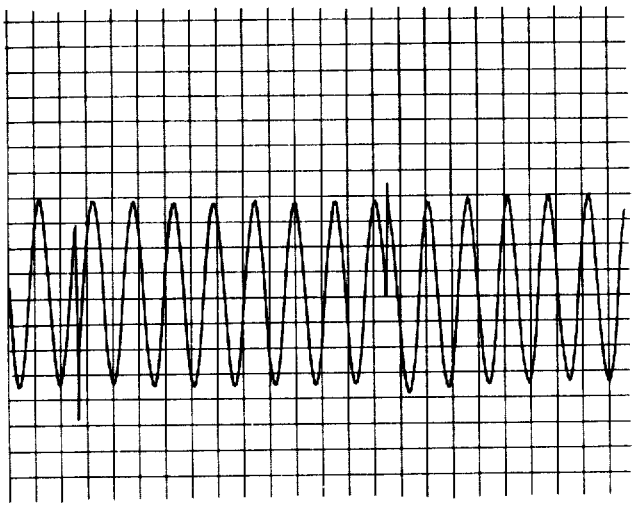
FIG .18B PRIOR ART
Figure 19A:
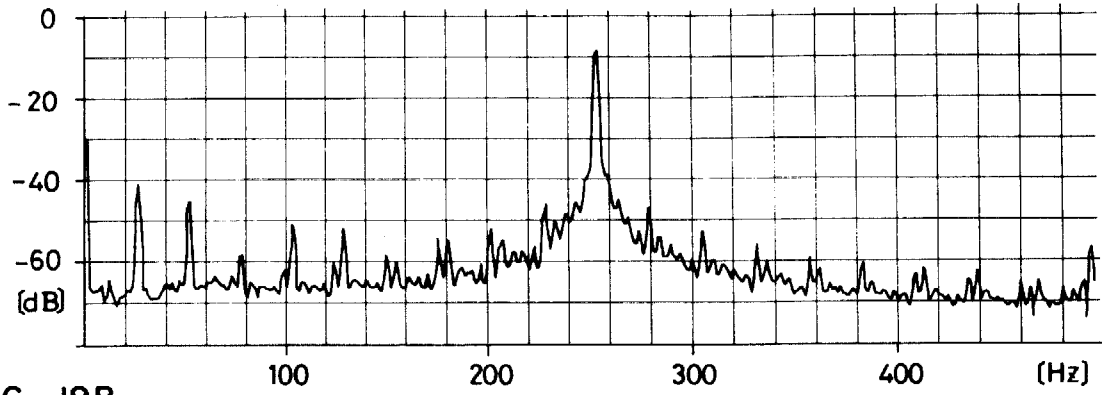
Figure 19B:
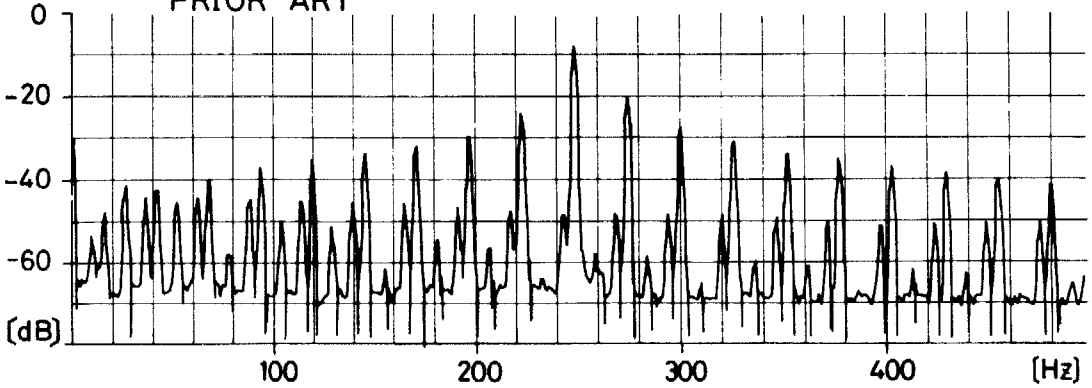

The quality of the sound as processed and reproduced in accordance with the present invention is remarkably enhanced as compared with the quality of the sound processed in the conventional manner. The unnaturalness peculiar to synthesization of the sound the pitch frequency of which is discontinuous is fully eliminated and no harmonic noise occurs. As a result, a smooth and natural but rapid flow of speech can be achieved. Although a quantitative analysis of an auditive impression of the sound quality is difficult, an example of such analysis using a monotone sine wave revealed that the junction of the waves of the adjacent sound elements is hardly discerned when the sound signal is processed in accordance with the present invention, as shown in FIG. 18A, although the discontinuity at the junction of the adjacent sound elements, as processed in accordance with the conventional system is extremely conspicuous, as shown in FIG. 18B. A comparison of the spectrum characteristics using a sine wave with respect to an example of the present invention, as shown in FIG. 19A, and an example of the prior art, as shown in FIG. 19B, also revealed a remarkable difference. Thus, the result of data measurement shows that the invention enhances a signal to noise ratio by approximately 20 dB.

Figure 20A:
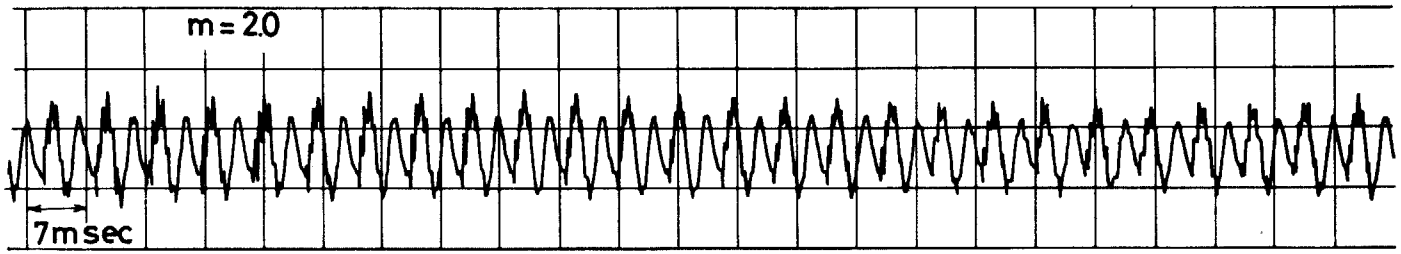
Figure 20B:
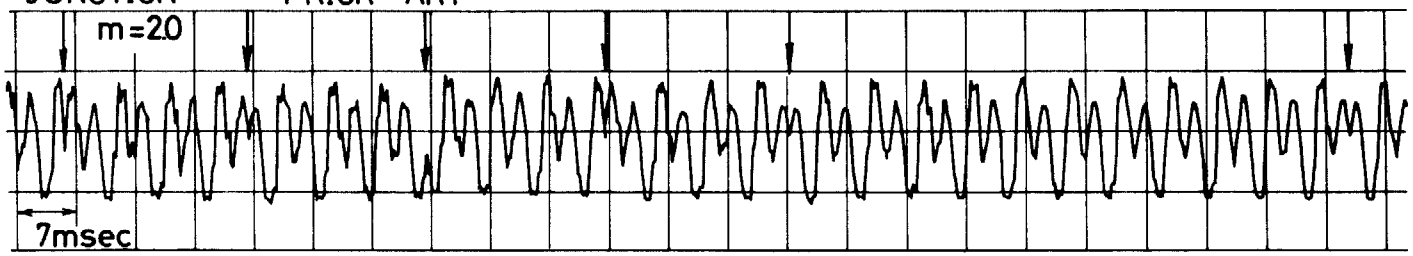

FIGS. 20A and 20B show examples of the junction of the waveforms of the adjacent sound elements with respect to a vowel sound "i". FIG. 20A shows an example of the junction in accordance with the present invention, wherein the junction of the adjacent sound elements is hardly discernible. On the other hand, the junction of the adjacent sound elements with respect to the same vowel sound "i" can be clearly observed at every junction as shown in an arrow mark in FIG. 20B.

Thus, according to the present invention, the quality of sound in sound synthesization is much enhanced. Therefore, even if the invention is employed in a tape recorder to increase a reproduction speed, the intelligibility is fully ensured. According to the prior art, the reproduction speed ratio m being 2.5 was an upper limit from the standpoint of the intelligibility. However, according to the present invention, the upper limit of the reproduction speed ratio m is enhanced up to 3.0 to 3.3. However, as far as voice information is concerned, a time dependent change of the sound spectrum is an important factor and hence deterioration of the sound quality by virtue of the discontinuity of the sound spectrum need be taken into consideration.

Figure 1:
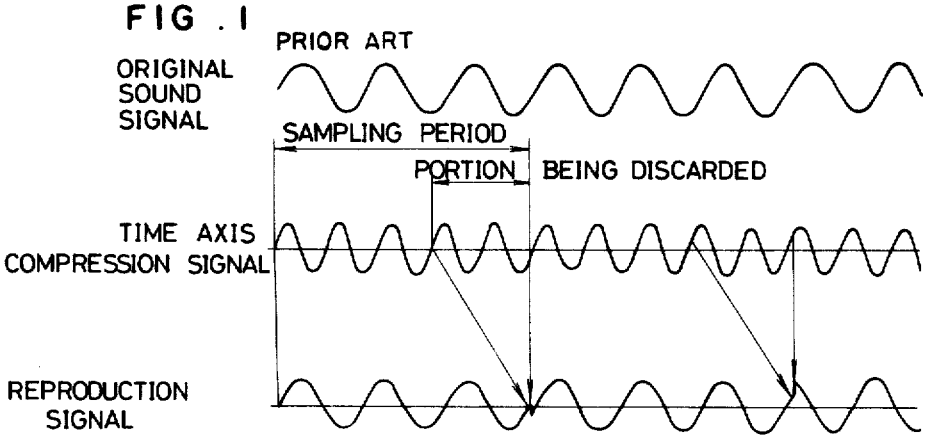
FIG. 1 is a prior art timing chart of waveforms of a sound signal for explaining the principle of a sound synthesizing apparatus which constitutes the background of the invention.
Figure 4:
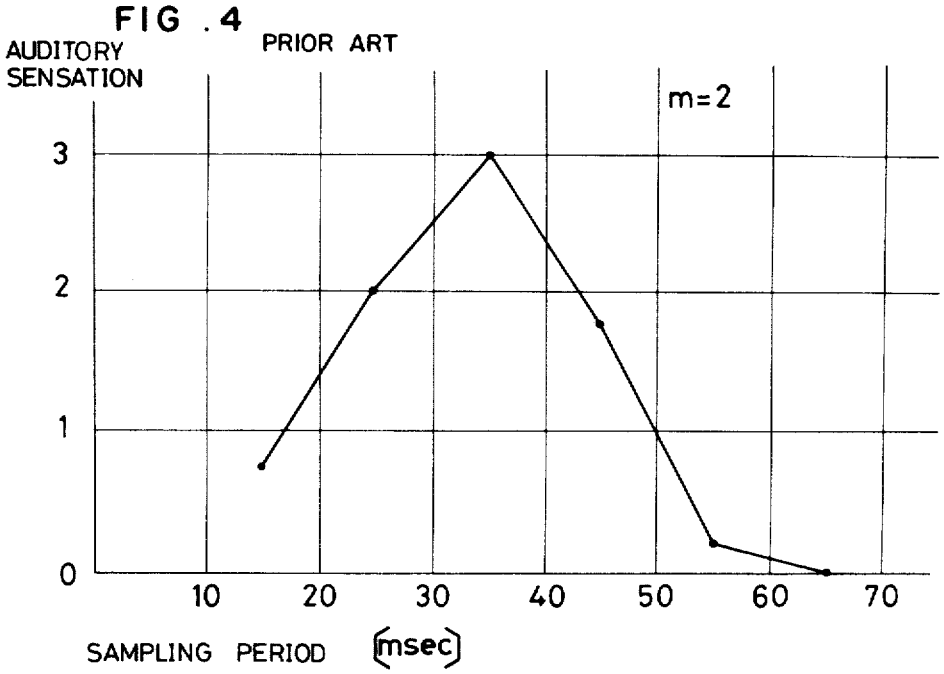
FIG. 4 is a prior art graph showing a relation between a sound quality and a repetition period, wherein the abscissa indicates a repetition period and the ordinate indicates a sound quality.

Generally, a sound is recognized based on a complicated relative positional relation of the frequency energy, including a formant frequency and an antiformant frequency, and a manner of movement of such frequency energy. Thus, the discontinuity of a spectrum variation caused by discarding redundant sound element portions upon which the principle of high speed reproduction tape recorder is based could leave more or less unnaturalness in recognizing a reproduced sound. It is believed that to make the sampling cycle short could be effective in reducing such influence. With a conventional apparatus wherein the present invention is not employed, the shorter the sampling cycle the more a discontinuity noise at the junction between the adjacent sound elements and thus the more a reduced signal to noise ratio. However, according to the present invention, since a discontinuity noise is fundamentally eliminated, the present invention allows for a shorter sampling cycle, which enables enhancement of the sound quality. The inventors experimented with two examples, one employing a sampling cycle of 38.4 msec and the other employing a sampling cycle of 25.6 msec. A comparison of actual hearing revealed that the latter brings about an excellent sound quality. It should be particularly noted that the result is reversed to the result shown in FIG. 4 for determining a sampling cycle in the prior art. Nevertheless, selection of the sampling cycle shorter than the above described example could entail a problem from the standpoint of a processing capability of a microcomputer presently available.

The inventive sound synthesizing apparatus can be applied not only to a high speed reproduction tape recorder but also to reproduction of the sound on the occasion of a high speed reproduction of a video tape recorder, a remote high speed reproduction of an automatic answer telephone, sound synthesization in scramble transmission, sound element compilation, frequency conversion of a sound signal and other sound processing apparatus. In the prior art, employment of a microcomputer in domestic equipment was rather limited to mere control computation. However, the present invention revealed applicability of a microcomputer in the field of real time processing of a sound signal.

In the foregoing, the present invention was described as embodied such that the similarity of the waveforms at the trailing end portion of a preceding sound element and the leading end portion of the succeeding sound element is evaluated by the use of a microcomputer as programed to execute such operation. Alternatively, the operation for evaluating such similarity can be executed by the use of a hardware implementation to be described in the following.

FIG. 21 shows a block diagram of a hardware implementation for executing an operation for similarity evaluation in accordance with the present invention. It is pointed out that the embodiment shown is structured to evaluate a similarity junction in accordance with the above described equation (12). Referring to FIG. 21, the same portions as those shown in FIG. 5 have been denoted by the same reference characters and a detailed description thereof will be omitted. In the embodiment shown, the block corresponding to the write clock generator 110 of the FIG. 5 embodiment is shown as a frequency divider 203 of a variable frequency division rate which is adapted to be variable as a function of the reproduction speed ratio m and similarly the block corresponding to the read clock generator 116 in the FIG. 5 embodiment is shown as a frequency divider 202. Accordingly, a common master clock generator 201 is coupled to these frequency dividers 202 and 203. The fundamental clock pulses obtained from the master clock generator 201 is frequency divided by these frequency dividers 203 and 202, thereby to provide a write clock pulse having the frequency f1 and a read clock pulse having the frequency f2, as described previously. The read clock pulse from the read clock generator, i.e. the frequency divider 202, is applied to a frequency divider 221 having a fixed frequency division rate of 1/N. The frequency divider 203 comrises a frequency divider of a variable frequency division rate type. The write clock pulse obtained from the write clock generator, i.e., the variable frequency divider 203, is applied to a counter 222, where the write clock pulse is counted. The counter 222 provides a count up output, when the same counts the clock pulses of the number k+M+N, as in case of the previously described embodiment. The counter 222 also provides a count up output, when the same counts the write clock pulses of the number M+R and the clock pulses of the number M+N. It is pointed out that the same reference characters as used in the previous described embodiment are used in the embodiment now under discussion.

The embodiment shown further comprises memories 206 and 207 for storing a digital signal, such as a random-access memory or a shift register. The memories 206 and 207 serve to store the digital data obtained from the analog/digital converter 124. The memory 206 has a storage capacity or addresses of the number M+R, while the memory 207 has a storage capacity of addresses of the number M. The write address of the memory 206 is determined by a write address generator 204 and the write address of the memory 207 is determined by a write address generator 205. The write address generator 204 is connected to receive the Q output or the $\overline{Q}$ output of the frequency divider 221 and is enabled when the state is reversed, and in case where the memory 206 is implemented by a random-access memory, generates an addressing output including a chip selecting output. The write address generator 204 is disabled responsive to the output obtained when the pulses of the number M+R are counted by the counter after reversing of the output Q or $\overline{Q}$. The write address generator 205 is also connected to receive a count output of the number k+M+1 and the count output of the number k+M+N of the counter 222 to be enabled responsive to the output of the number k+M+1 and disabled to the output of the number k+M+N.

The respective read addresses of the memory 206 and 207 are designated by the corresponding read address generators 211 and 212. These read address generators 211 and 212 also provide addressing outputs including chip selecting outputs, as in case of the above described write address generators 204 and 205. The read address generator 211 is started or enabled when the pulses of the number M+R are counted by the counter 222, i.e. responsive to the (M+R+1)th clock, whereupon the addressing is achieved in association with the clock signal C from an operation clock generator 208. Similarly, the read address generator 212 is started or enabled from the (M+R+1)th pulse and the addressing is achieved in association with the clock C of the operation clock generator 208. The operation clock generator 208 is enabled responsive to the count up output obtained at the (M+R)th pulse from the counter 222, thereby to provide a necessary operation clock C. The clock from the operation clock generator 208 is further applied to a frequency divider 209 of the frequency division rate 1/M and is further applied to a clock generator 210 having a frequency dividing function of the frequency division rate 1/R. Accordingly, necessary clocks C1, C2 and C3 are obtained from the clock generator 210 to a storing circuit 215, comparison circuit 216 and a storing circuit 217, to be described subsequently.

The outputs as read out from the memories 206 and 207 are applied to a subtraction circuit 213 responsive to the clock C from the above described operation clock generator 208, i.e. each time the read address generators 211 and 212 are addressed. The subtraction circuit 213 serves to achieve a subtracting operation with respect to two pieces of the digital data as inputted, whereby a difference therebetween is obtained and is applied to an integrating/adding circuit 214. The integrating/adding circuit 214 accumulates in succession the differences inputted from the subtraction circuit 213. The addition data of the integrating/adding circuit 214 is applied to the storing circuit 215 and the comparison circuit 216. The data stored in the storing circuit 215 is applied as another input to the comparison circuit 216 when the following additional data is obtained. The comparison circuit 216 serves to compare the output of the storing circuit 215 with the output of the integrating/adding circuit 214 to determine which is smaller. Whenever the data of a smaller value is determined, the clock number or address associated with the data of the smaller value is applied to the storing circuit 217. The output from the storing circuit 217 is applied to the counter 222 as an optimum shift amount k. Accordingly, the counter 222 is responsive to the clock of the number k to provide a count up output of the pulses of the number k+M+N.

When the output Q or $\overline{Q}$ of the frequency divider 221 is reversed, the write address generators 204 and 205 are enabled. Accordingly, the write address generators 204 and 205 serve to address the corresponding storing circuits 206 and 207. Accordingly, the storing circuits 206 and 207 store the digital data converted by the analog/digital converter 124 in the selected addresses. When the counter 222 counts the write clock pulses of the number M+R, the write address generator 204 is disabled, whereby the storing circuit 206 is prevented from storing any data any more. Thus, it follows that the storing circuit 206 stores the data samples of the number M+R from the beginning of each sampling cycle. The write address generator 205 is disabled responsive to the count up output of the clock pulses of the number k+M+N by the counter 222, whereby the storing circuit 207 is prevented from storing any data any more. Since the capacity of the storing circuit 207 is of the number of M samples, the storing circuit 207 proves to store the data samples of the number M starting from the (k+N)th sample to the (k+M+N)th sample of each sampling cycle.

On the other hand, during each sampling cycle, when the counter 222 counts the pulses of the number M+R, the operation clock generator 208 is enabled responsive thereto, whereby a necessary operation clock C is obtained. The read address generators 211 and 212 are enabled responsive to the clock immediately after the counter 122 counts the clock pulses of the number M+R, whereupon the read addresses of the respective corresponding storing circuits 206 and 207 are selected. Accordingly, the data samples of the number M+R are applied in succession from the storing circuit 206 to the subtraction circuit 213, while the data samples of the number M of the storing circuit 207 are applied to the other input of the subtraction circuit 213. The subtraction circuit 213 serves to execute a subtracting operation with respect to the input data received from the storing circuits 206 and 207 each time the data is inputted, whereupon the difference therebetween is applied to the integrating/adding circuit 214. The read address generators 211 and 212 are responsive to each operation clock C to control the storing circuits 206 and 207 to read out a single piece of data therefrom. Therefore, it follows that the subtraction circuit 213 is simultaneously supplied with two inputs. The integrating/adding circuit 214 serves to accumulate in succession the result obtained from the subtraction circuit 213 responsive to each operation clock C, i.e. the difference data. The sum thus obtained is stored in the storing circuit 215 responsive to the clock C1 from the clock generator 210. Then, the read address generator 211 has the selected address shifted by one, thereby to achieve addressing again in response to the operation clock C. Therefore, it follows that the data read out from the storing circuit 206 and the data read out from the storing circuit 207 are read out in a corresponding relation with the data shifted by one address. This means that a difference is evaluated between the data corresponding to the trailing end portion of the preceding sound element and the data corresponding to the leading end portion of the succeeding sound element, with the latter data shifted by one sample point. The subtraction circuit 213 effects again a similar operation, whereby the differences of the data values with one address shifted are in succession evaluated. And similarly accumulation is effected by the integrating/adding circuit 214. The accumulated output data is applied to one input of the comparator 216. Then, the clock C1 is obtained from the clock generator 210, whereupon similar data is stored in the storing circuit 215. At the same time, the data previously accumulated and stored in the storing circuit 215 is applied to the input of the comparator 216. When the clock C2 is obtained from the clock generator 210, the comparator 216 serves to compare the data previously stored with the accumulated data just obtained, to determine which is smaller. When the data of a smaller value is determined, the read address or the clock number obtained from the read address generator 211 where the data of a smaller value was obtained is applied to the storing circuit 217. Then the clock C3 is obtained from the clock generator 210 and the address of the clock number thereof is stored in the storing circuit 217.

Thereafter the address is further shifted by one in the read address generator 211. Then the subtraction circuit 213, the integrating/adding circuit 214, the storing circuit 215, the comparator 216 and the storing circuit 217 repeat the above described operation. Such repetitive operation is effected each time the address is shifted by one in the read address generator 211 and is stopped whenever the shift reaches the number R. Accordingly, it follows that the storing circuit 217 stores the shift amount of the address or the number of clocks obtained as the minimum accumulated value during a period until the stage where the read address of the storing circuit 206 is in succession shifted to become the shift amount R. The above described number of clocks as stored in the storing circuit 217 is the optimum shift amount described in conjunction with the previously described embodiment.

The shift amount thus obtained from the storing circuit 217 is applied to the counter 222. Accordingly, when the counter 222 counts the number k+M+N based on the inputted data, the count up output is obtained therefrom, whereby the AND gates 112 and 113 are disabled and the write clock pulse from the write clock generator, i.e. from the variable frequency divider 203 is stopped. Accordingly, the write clock pulse applied from the OR gate 115 to the analog shift register 103 or 104 is stopped and thereafter the write operation is inhibited.

Although in the FIG. 21 embodiment the storing circuit 206 and 207 each were described as implemented by a random-access memory, it is needless to say that these may be implemented by a well-known shift register or the like for the purpose of the same operation. In case where the storing circuits 206 and 207 are implemented by a shift register, the write address generators 204 and 205 and the read address generators 211 and 212 may be simply implemented by a counter or the like. Meanwhile, the above described operation can be performed even within the above described processing time period tc. Thus, it would be appreciated that even with the above described hardware implementation the features and advantages as described in conjunction with FIGS. 18A to 20B can be performed.

Although in the foregoing description the term "leading end portion" was used to mean a portion of a succeeding sound element which is to be joined to a trailing portion of a preceding sound element, it is pointed out that the said term was used to boradly mean a portion of the data being loaded in advance in the random-access memory or the digital storage for the purpose of evaluating a joining timing between the trailing end portion data of N bit of the preceding sound element previously loaded in the analog memory and the following data of N bit that is to follow the previous data in the following sampling period, in other words, the above described samples of the number M+R. Thus, the term "leading end portion" should be interpreted in a broader sense.

It is further pointed out that the present invention is applicable not only to a system where a sound is synthesized in reproduction of the sound as the time axis is expanded but also to any types of a sound synthesizing system wherein a sound is snythesized by joining small pieces of sound elements, such as in reproduction of a sound as the time axis is compressed by circulating each sound element, sampling each sound element such that the adjacent sound elements are overlapped, and the like. It is intended that the present invention also cover such modifications.

Although the present invention has been described and illustrated in detail, it is to be clearly understood that the same is by way of limitation, the spirit and scope of the present invention being limited only by the terms of the appended claims.

What is claimed is:

1. A sound synthesizing apparatus, comprising:

means for providing an analog sound signal, means for providing a signal representing a predetermined sampling period, storage means, means for providing a write clock signal having a first frequency, means for providing a read clock signal having a second frequency, control means responsive to said sampling period representing signal and said write clock signal for writing in said storage means said analog sound signal as a succession of sound elements, each determined by said sampling period representing signal, and responsive to said read clock signal for reading said sound elements in succession from said storage means, means for joining said sound elements read from said storage means in succession at a junction therebetween for synthesization of a reproduced sound, means responsive to said write clock signal for providing first data concerning the waveform of a preceding sound element being stored in said storage means and second data concerning the waveform of a succeeding sound element being stored in said storage means following said preceding sound element, means responsive to said first data and said second data for evaluating a phase relation between the waveforms of said preceding and succeeding sound elements for providing closer similarity of said waveforms of said preceding and succeeding sound elements in the vicinity of said junction between said preceding and succeeding sound elements, and means responsive to said phase relation evaluating means for controlling a phase relation between said preceding and succeeding sound elements for joining said preceding and succeeding sound elements with closer similarity of waveforms of said preceding and succeeding sound elements in the vicinity of said junction between said preceding and succeeding sound elements.

2. A sound synthesizing apparatus in accordance with claim 1, wherein said first and second data providing means are adapted to provide said first data concerning the waveform at the trailing end portion of a preceding sound element and said second data concerning the waveform at the leading end portion of a succeeding sound element following said preceding sound element.

3. A sound synthesizing apparatus in accordance with claim 2, wherein said phase relation controlling means comprises means responsive to said phase relation evaluating means for controlling the timing of the writing operation of said succeeding sound element in said storage means.

4. A sound synthesizing apparatus in accordance with claim 3, wherein said first and second data providing means comprises means for providing a sampling clock signal, sampling means responsive to said sampling clock signal for sampling said preceding and succeeding sound elements for providing sample values as said first and second data, and sample storage means for storing said sample values.

5. A sound synthesizing apparatus in accordance with claim 4, which further comprises analog/digital converting means for converting said sample values into a digital form.

6. A sound synthesizing apparatus in accordance with claim 4, wherein said phase relation evaluating means comprises means for evaluating a shifting value in terms of the sampling points of said sample values of said first data for providing closer similarity of said waveforms of said preceding and succeeding sound elements in the vicinity of the junction between said preceding and succeeding sound elements.

7. A sound synthesizing apparatus in accordance with claim 5, wherein said sampling clock signal is adapted to be synchronized with said write clock signal.

8. A sound synthesizing apparatus in accordance with claim 6, wherein said sampling clock signal providing means comprises frequency dividing means for frequency dividing said write clock signal at a predetermined frequency division rate.

9. A sound synthesizing apparatus in accordance with claim 6, which further comprises counter means for counting said sampling clock signal for controlling said first and second predetermined numbers.

10. A sound synthesizing apparatus in accordance with claim 9, wherein said counter means is adapted to define, as a first storage period, a period from the beginning of each sampling period determined by said sampling period representing signal until said first predetermined number of sampling clock signals are counted, and to define, as a second storage period, a period after said first predetermined number is counted and from said second predetermined number of sampling clock signals before the end of said sampling period to the end of said second sampling period.

11. A sound synthesizing apparatus in accordance with claim 10, wherein said sample storage means comprises addressing means for addressing in succession said sample storage means responsive to said sampling clock signal in said first and second storage periods.

12. A sound synthesizing apparatus in accordance with claim 11, wherein said sample storage means comprises a random-access memory.

13. A sound synthesizing apparatus in accordance with claim 11, wherein said sample storage means comprises a shift register.

14. A sound synthesizing apparatus in accordance with claim 6, wherein said phase relation evaluating means comprises means for evaluating a square error between said sample values at said trailing end portion of said preceding sound element obtainable from said sample storage means and said sample values at said leading end portion of said succeeding sound element obtainable from said sample storage, shifting means coupled to said square error evaluating means for shifting in succession a correlation of said sample values obtainable from said sample storage means for enabling said square error evaluation at each shift, and means for determining a shift amount for minimizing said square error among the successively evaluated square errors.

15. A sound synthesizing apparatus in accordance with claim 6, wherein said phase relation evaluating means comprises means for evaluating a correlation function between said sample values of said trailing end portion of said preceding sound element obtainable from said storage means and said sample values of said leading end portion of said succeeding sound element obtainable from said sample storage means, shifting means coupled to said correlation function evaluating means for shifting in succession a correlation of said sample values obtainable from said sample storage means for enabling said correlation function evaluation at each shift, and means for determining a shift amount for maximizing said correlation function among the successively evaluated correlation functions.

16. A sound synthesizing apparatus in accordance with claim 6, wherein said phase relation evaluating means comprises means for evaluating a sum of the absolute value of a difference between said sample values of the trailing end portion of said preceding sound element obtainable from said sample storage means and said sample values of said leading end portion of said succeeding sound element obtainable from said sample storage means, shifting means coupled to said sum evaluating means for shifting in succession a correlation of said sample values obtainable from said sample storage means for enabling said sum evaluation of the absolute value of said difference at each shift, and means for determining a shift amount for minimizing said sum among the successively evaluated sums.

17. A sound synthesizing apparatus in accordance with claim 5, wherein said analog/digital converting means comprises means for converting each said sample value into a two-value signal.

18. A sound synthesizing apparatus in accordance with claim 17, wherein said means for converting each said sample value into a two-value signal comprises level detecting means for detecting each said sample value at a predetermined level.

19. A sound synthesizing apparatus in accordance with claim 18, wherein said detecting level of said level detecting means is selected to be a zero level of said sample value.

20. A sound synthesizing apparatus in accordance with claim 19, which further comprises biasing means for biasing said sample value such that said detecting level of said level detecting means is selected to be a given bias level.

21. A sound synthesizing apparatus in accordance with claim 17, wherein said means for converting each said sample value into a two-value signal comprises amplitude saturation amplifying means for amplitude saturating said sample value.

22. A sound synthesizing apparatus in accordance with claim 21, which further comprises clamping means for clamping the output of said amplitude saturating amplifying means at a predetermined level.

23. A sound synthesizing apparatus in accordance with claim 6, wherein said phase relation evaluating means comprises means for adopting, as first sampled data, the sample values of said succeeding sound element as shifted by a shift amount for representing the closest similarity of said waveforms of said preceding and succeeding sound elements, means for comparing a predetermined number of sample values in the vicinity of and including said first sample data with the sample values of the trailing end portion of said preceding sound element, means for adopting, as second sampled data, one set of sample values among said predetermined number of sets of digital sample values closest to the sample value of the trailing extremity of said preceding sound element, and means for evaluating a shift amount with which said second sample data is obtained.

24. A sound synthesizing apparatus in accordance with claim 1, wherein said storage means comprises an analog memory.

25. A sound synthesizing apparatus in accordance with claim 24, wherein said analog memory comprises a bucket brigade device.

26. A sound synthesizing apparatus in accordance with claim 24, wherein said analog memory comprises a charge coupled device.

27. A sound synthesizing apparatus in accordance with claim 1, wherein said storage means comprises a digital memory, and which further comprises analog/digital converting means for converting the sound element derived from said analog sound signal into a digital data for writing said digital data into said digital memory, and digital/analog converter means for converting the output read from said digital memory into an analog signal.

28. A sound synthesizing apparatus in accordance with claim 1, wherein said write clock signal generating means and said read clock signal generating means each comprise an independent clock pulse generator.

29. A sound synthesizing apparatus in accordance with claim 1, wherein said write clock signal generating means and said read clock signal generating means each comprise fundamental clock signal generating means, said write clock signal generating means comprises frequency dividing means for frequency dividing said fundamental clock signal at a frequency division rate suited for generation of said write clock signal, said read clock signal generating means comprises frequency dividing means for frequency dividing said fundamental clock signal at a frequency division rate suited for generation of said read clock signal.

30. A sound synthesizing apparatus in accordance with claim 29, wherein said write clock signal generating means further comprises means coupled to said frequency dividing means for varying the frequency division rate of said frequency dividing means.

31. A sound synthesizing apparatus in accordance with claim 1, wherein said means for determining said sampling period comprises frequency dividing means for dividing one of said write clock signal and said read clock signal at a predetermined frequency division rate.

32. A sound synthesizing apparatus in accordance with claim 4, wherein said storage means has a predetermined number of storing unit positions, said storage means is adapted to store substantially the same predetermined number of samples last obtained during the sampling period following a preceding sampling period as a succeeding sound element following said preceding sound element, and said first and second data providing means are adapted such that said second predetermined number of sampling clock signals substantially correspond to said leading end portion of said succeeding sound element being stored in said following sampling period.

33. A sound synthesizing apparatus in accordance with claim 32, wherein said phase relation evaluating means comprises means for evaluating a shifting value in terms of the sampling points of said sample values of said first data for providing closer similarity of said waveforms of said preceding and succeeding sound elements in the vicinity of the junction between said preceding and succeeding sound elements.

34. A sound synthesizing apparatus in accordance with claim 33, wherein said phase relation controlling means comprises means responsive to said shifting value for stopping said write clock signals applied to said storage means.

35. A sound synthesizing apparatus in accordance with claim 34, wherein said write clock signals are stopped during a time period corresponding to said shifting value in said following sampling period counting from the end of said following sampling period.

36. A sound synthesizing apparatus, comprising:

means for providing an analog sound signal the time axis of which has been compressed by a factor 1/m as compared with that of an original sound, means for providing a signal representing a predetermined sampling period, storage means, means for providing a write clock signal having a first frequency, means for providing a read clock signal having a second frequency, control means responsive to said sampling period representing signal and said write clock signal for writing into said storage means said analog sound signal as a succession of sound elements, each determined by said sampling period representing signal, and responsive to said read clock signal for reading said sound elements in succession from said storage means, said first frequency being selected such that the time axis of said sound elements read from said storage means is expanded by a factor m, whereby the time axis of said sound elements read from said storage means is regained to the original state of said original sound, means for joining said sound elements read from said storage means in succession at a junction therebetween for synthesization of a reproduced sound, means responsive to said write clock signal for providing first data concerning the waveform of a preceding sound element being stored in said storage means and second data concerning the waveform of a succeeding sound element being stored in said storage means following said preceding sound element, means responsive to said first data and said second data for evaluating a phase relation between the waveforms of said preceding and succeeding sound elements for providing closer similarity of said waveforms of said preceding and succeeding sound elements in the vicinity of said junction between said preceding and succeeding sound elements, and means responsive to said phase relation evaluating means for controlling a phase relation between said preceding and succeeding sound elements for joining said preceding and succeeding sound elements with closer similarity of waveforms of said preceding and succeeding sound elements in the vicinity of said junction between said preceding and succeeding sound elements.

37. A sound synthesizing apparatus in accordance with claim 36, wherein the ratio of said second frequency of said read clock signal to said first frequency of said write clock signal is determined in association with said time axis compression factor m.

38. A sound synthesizing apparatus in accordance with claim 36, wherein said write clock signal generating means and said read clock signal generating means each comprise fundamental clock signal generating means, said write clock signal generating means further comprises frequency dividing means for frequency dividing said fundamental clock signal at a frequency division rate suited for generation of said write clock signal, said read clock signal generating means further comprises frequency dividing means for frequency dividing said fundamental clock signal at a frequency division rate suited for generation of said read clock signal for providing said second frequency which is 1/m of said first frequency of said write clock signal.

39. A sound synthesizing apparatus in accordance with claim 36, wherein said first and second data providing means is adapted to provide said first data concerning the waveform at the trailing end portion of a preceding sound element and said second data concerning the waveform at the leading end portion of a succeeding sound element following said preceding sound element.

40. A sound synthesizing apparatus in accordance with claim 39, wherein said phase relation controlling means comprises means responsive to said phase relation evaluating means for controlling the timing of the writing operation of said succeeding sound element in said storage means.

41. A sound synthesizing apparatus in accordance with claim 40, wherein said first and second data providing means comprises means for providing a sampling clock signal, sampling means responsive to said sampling clock signals for sampling said preceding and succeeding sound elements for providing sample values, and sample storage means for storing said sample values as said first and second data.

42. A sound synthesizing apparatus in accordance with claim 41, wherein said first and second data providing means further comprises analog/digital converting means for converting said sample values into a digital form.

43. A sound synthesizing apparatus in accordance with claim 42, wherein said phase relation evaluating means comprises means for evaluating a shifting value in terms of the sampling points of said sample values of said first data for providing closer similarity of said waveforms of said preceding and succeeding sound elements in the vicinity of the junction between said preceding and succeeding sound elements.

44. A sound synthesizing apparatus in accordance with claim 42, wherein said phase relation evaluating means comprises means for adopting, as first sampled data, the sample values of said preceding sound element as shifted by a shift amount for representing the closest similarity of said waveforms of said preceding and succeeding sound elements, means for comparing a predetermined number of sample values in the vicinity of and including said first sampled data with the sample values of the trailing end portion of said preceding sound element, means for adopting, as second sampled data, one set of sample values among said predetermined number of sets of sample values closest to the sample value of the trailing extremity of said preceding sound element, and means for evaluating a shift amount with which said second sample data is obtained.

45. A sound synthesizing method, comprising the steps of providing an analog sound signal, providing a signal representing a predetermined sampling period, providing a write clock signal having a first frequency, providing a read clock signal having a second frequency, writing, as a function of said sampling period representing signal and said write clock signal, in storage means, said analog sound signal as a succession of sound elements, each determined by said sampling period representing signal, reading, as a function of said read clock signal, said sound elements in succession from said storage means, joining said sound elements read from said storage means in succession at a junction therebetween for synthesization for reproduced sound, providing, as a function of said write clock signal, first data concerning the waveform of a preceding sound element being stored in said storage means and second data concerning the waveform of a succeeding sound element being stored in said storage means following said preceding sound element, evaluating, based on said first data and said second data, a phase relation between the waveforms of said preceding and succeeding sound elements for providing closer similarity of said waveforms of said preceding and succeeding sound elements in the vicinity of said junction between said preceding and succeeding sound elements, and controlling, based on said evaluation of a phase relation, a phase relation between said preceding and succeeding sound elements for joining said preceding and succeeding sound elements with closer similarity of the waveforms of said preceding and succeeding sound elements in the vicinity of said junction between said preceding and succeeding sound elements.

46. A sound synthesizing method in accordance with claim 45, wherein said phase relation controlling step comprises the step of controlling, based on said evaluation of a phase relation, the timing of the writing operation of said succeeding sound element in said storage means.

47. A sound synthesizing method in accordance with claim 46, wherein said step of providing said first and second data comprises the steps of providing a sampling clock signal, sampling, as a function of said sampling clock signals, said preceding and succeeding sound elements for providing sample values, and storing said sample values in sample storage means as said first and second data.

48. A sound synthesizing method in accordance with claim 47, wherein said step of providing said first and second data further comprises the step of converting said sample values into a digital form.

49. A sound synthesizing method in accordance with claim 47, wherein said phase relation evaluating step comprises the steps of evaluating a shifting value in terms of the sampling points of said digital sample values of said first data for providing closer similarity of said waveforms of said preceding and succeeding sound elements in the vicinity of the junction between said preceding and succeeding sound elements.

50. A sound synthesizing method in accordance with claim 49, wherein said phase relation evaluating step comprises the steps of evaluating a square error between said sample values at said trailing end portion of said preceding sound element obtainable from said sample storage means and said sample values at said leading end portion of said succeeding sound element obtainable from said sample storage means, shifting in succession a correlation of said sample values obtainable from said sample storage means for enabling said square error evaluation at each shift, and determining a shift amount for minimizing said square error among the successively evaluated square errors.

51. A sound synthesizing method in accordance with claim 49, wherein said phase relation evaluating step comprises the steps of evaluating a correlation function between said sample values of said trailing end portion of said preceding sound element obtainable from said sample storage means and said sample values of said leading end portion of said succeeding sound element obtainable from said sample storage means, shifting in succession a correlation of said sample values obtainable from said sample storage means for enabling said correlation function evaluation at each shift, and determining a shift amount for maximizing said correlation function among the successively evaluated correlation functions.

52. A sound synthesizing method in accordance with claim 49, wherein said phase relation evaluating step comprises the steps of evaluating a sum of the absolute value of a difference between said sample values of the trailing end portion of said preceding sound element obtainable from said sample storage means and said sample values of said leading end portion of said succeeding sound element obtainable from said sample storage means, shifting in succession a correlation of said sample values obtainable from said sample storage means for enabling said sum evaluation of the absolute value of said difference at each shift, and determining a shift amount for minimizing said sum among the successively evaluated sums.

53. A sound synthesizing method in accordance with claim 49, wherein said phase relation evaluating step comprises the steps of adopting, as first sampled data, the sample values of said succeeding sound element as shifted by a shift amount for representing the closest similarity of said waveforms of said preceding and succeeding sound elements, comparing a predetermined number of sample values in the vicinity of and including said first sample data with the sample values of the trailing end portion of said preceding sound element, adopting, as second sampled data, one set of sample values among said predetermined number of sets of sample values closest to the sample value of the trailing extremity of said preceding sound element, and evaluating a shift amount with which said second sample data is obtained.

54. A sound synthesizing method, comprising the steps of providing an analog sound signal the time axis of which has been compressed by a factor 1/m as compared with that of an original sound, providing a signal representing a predetermined sampling period, providing a write clock signal having a first frequency, providing a read clock signal having a second frequency, writing, as a function of said sampling period representing signal and said write clock signal, in storage means, said analog sound signal as a succession of sound elements, each determined by said sampling period representing signal, reading, as a function of said read clock signal, said sound elements in succession from said storage means, said first frequency being selected such that the time axis of said sound elements read from said storage means is expanded by a factor m, whereby the time axis of said sound elements read from said storage means is regained to the original state of said original sound, joining said sound elements read from said storage means in succession at a junction therebetween for synthesization for reproduced sound, providing, as a function of said write clock signal, first data concerning the waveform of a preceding sound element being stored in said storage means and second data concerning the waveform of a succeeding sound element being stored in said storage means following said preceding sound element, evaluating, based on said first data and said second data, a phase relation between the waveforms of said preceding and succeeding sound elements for providing closer similarity of said waveforms of said preceding and succeeding sound elements in the vicinity of said junction between said preceding and succeeding sound elements, and controlling, based on said evaluation of a phase relation, a phase relation between said preceding and succeeding sound elements for joining said preceding and succeeding sound elements with closer similarity of the waveforms of said preceding and succeeding sound elements in the vicinity of said junction between said preceding and succeeding sound elements.

55. A sound synthesizing method in accordance with claim 54, wherein said phase relation controlling step comprises the step of controlling, based on said evaluation of a phase relation, the timing of the writing operation of said succeeding sound element in said storage means.

56. A sound synthesizing method in accordance with claim 55, wherein said step of providing said first and second data comprises the steps of providing a sampling clock signal, sampling, as a function of said sampling clock signals, said preceding and succeeding sound elements for providing sample values, and storing said sample values in sample storage means as said first and second data.

57. A sound synthesizing method in accordance with claim 56, wherein said step of providing said first and second data further comprises the step of converting said sample values into a digital form.

58. A sound synthesizing method in accordance with claim 57, wherein said phase relation evaluating step comprises the steps of evaluating a shifting value in terms of the sampling points of said digital sample values of said first data for providing closer similarity of said waveforms of said preceding and succeeding sound elements in the vicinity of the junction between said preceding and succeeding sound elements.

59. A sound synthesizing method in accordance with claim 58, wherein said phase relation evaluating step comprises the steps of evaluating a square error between said sample values at said trailing end portion of said preceding sound element obtainable from said sample storage means and said sample values at said leading end portion of said succeeding sound element obtainable from said sample storage means, shifting in succession a correlation of said sample values obtainable from said sample storage means for enabling said square error evaluation at each shift, and determining a shift amount for minimizing said square error among the successively evaluated square errors.

60. A sound synthesizing method in accordance with claim 58, wherein said phase relation evaluating step comprises the steps of evaluating a correlation function between said sample values of said trailing end portion of said preceding sound element obtainable from said sample storage means and said sample values of said leading end portion of said succeeding sound element obtainable from said sample storage means, shifting in succession a correlation of said sample values obtainable from said sample storage means for enabling said correlation function evaluation at each shift, and determining a shift amount for maximizing said correlation function among the successively evaluated correlation functions.

61. A sound synthesizing method in accordance with claim 58, wherein said phase relation evaluating step comprises the steps of evaluating a sum of the absolute value of a difference between said sample values of the trailing end portion of said preceding sound element obtainable from said sample storage means and said sample values of said leading end portion of said succeeding sound element obtainable from said sample storage means, shifting in succession a correlation of said sample values obtainable from said sample storage means for enabling said sum evaluation of the absolute value of said difference at each shift, and determining a shift amount for minimizing said sum among the successively evaluated sums.

62. A sound synthesizing method in accordance with claim 59, wherein said phase relation evaluating step comprises the steps of adopting, as first sampled data, the sample values of said succeeding sound element as shifted by a shift amount for representing the closest similarity of said waveforms of said preceding and succeeding sound elements, comparing a predetermined number of sample values in the vicinity of and including said first sample data with the sample values of the trailing end portion of said preceding sound element, adopting, as second sampled data, one set of sample values among said predetermined number of sets of sample values closest to the sample value of the trailing extremity of said preceding sound element, and evaluating a shift amount with which said second sample data is obtained.

*63. sound synthesizing apparatus comprising:*

*means for providing a sound signal,*

*means for providing a signal representing a predetermined sampling period,*

*storage means,*

*means for providing a write clock signal having a first frequency,*

*means for providing a read clock signal having a second frequency,*

*control means responsive to said sampling period representing signal and said write clock signal for writing in said storage means said sound signal as a succession of sound elements, each determined by said sampling period representing signal, and responsive to said read clock signal for reading said sound elements in succession from said storage means,*

*means for joining said sound elements read from said storage means in succession at a junction therebetween for synthesization of a reproduced sound,*

*means responsive to said write clock signal for providing first data concerning the waveform of a preceding sound element being stored in said storage means and second data concerning the waveform of a succeeding sound element being stored in said storage means following said preceding sound element,*

*means responsive to said first data and said second data for evaluating a phase relation between the waveforms of said preceding and succeeding sound elements for providing closer similarity of said waveforms of said preceding and succeeding sound elements in the vicinity of said junction between said preceding and succeeding sound elements, and*

*means responsive to said phase relation evaluating means for controlling a phase relation between said preceding and succeeding sound elements for joining said preceding and succeeding sound elements with closer similarity of waveforms of said preceding and succeeding sound elements in the vicinity of said junction between said preceding and succeeding sound elements.*

*64. sound synthesizing apparatus in accordance with claim 63, wherein said storage means comprises a digital memory means.*

*65. sound synthesizing apparatus in accordance with claim 64, wherein the digital memory means is a shift register.*

*66. sound synthesizing apparatus in accordance with claim 64, wherein the digital memory means is a random-access memory.*

*67. sound synthesizing apparatus in accordance with claim 66, wherein said storage means further comprises a digital/analog converting means connected to an output of the random-access memory and an addressing circuit connected to the random-access memory.*

*68. sound synthesizing apparatus in accordance with claim 66, wherein said storage means further comprises an analog/digital converting means connected to an input of the random-access memory.*

*69. sound synthesizing apparatus, comprising:*

*means for providing a sound signal the time axis of which has been compressed by a factor 1/m as compared with that of an original sound,*

*means for providing a signal representing a predetermined sampling period,*

*storage means,*

*means for providing a write clock signal having a first frequency,*

*means for providing a read clock signal having a second frequency,*

*control means responsive to said sampling period representing signal and said write clock signal for writing into said storage means said sound signal as a succession of sound elements, each determined by said sampling period representing signal, and responsive to said read clock signal for reading said sound elements in succession from said storage means, said first frequency being selected such that the time axis of said sound elements read from said storage means is expanded by a factor m, whereby the time axis of said sound elements read from said storage means is regained to the original state of said original sound,*

*means for joining said sound elements read from said storage means in succession at a junction therebetween for synthesization of a reproduced sound,*

*means responsive to said write clock signal for providing first data concerning the waveform of a preceding sound element being stored in said storage means and second data concerning the waveform of a succeeding sound element being stored in said storage means following said preceding sound element,*

*means responsive to said first data and said second data for evaluating a phase relation between the waveforms of said preceding and succeeding sound elements for providing closer similarity of said waveforms of said preceding and succeeding sound elements in the vicinity of said junction between said preceding and succeeding sound elements, and*

*means responsive to said phase relation evaluating means for controlling a phase relation between said preceding and succeeding sound elements for joining said preceding and and succeeding sound elements with closer similarity of waveforms of said preceding and succeeding sound elements in the vicinity of said junction between said preceding and succeeding sound elements.*

*70. sound synthesizing method, comprising the steps of*

*providing a sound signal,*

*providing a signal representing a predetermined sampling period,*

*providing a write clock signal having a first frequency,*

*providing a read clock signal having a second frequency,*

*writing, as a function of said sampling period representing signal and said write clock signal, in storage means, said sound signal as a succession of sound*

*elements, each determined by said sampling period representing signal,*

*reading, as a function of said read clock signal, said sound elements in succession from said storage means,*

*joining said sound elements read from said storage means in succession at a junction therebetween for synthesization for reproduced sound,*

*providing, as a function of said write clock signal, first data concerning the waveform of a preceding sound element being stored in said storage means and second data concerning the waveform of a succeeding sound element being stored in said storage means following said preceding sound element,*

*evaluating, based on said first data and said second data, a phase relation between the waveforms of said preceding and succeeding sound elements for providing closer similarity of said waveforms of said preceding and succeeding sound elements in the vicinity of said junction between said preceding and succeeding sound elements, and*

*controlling, based on said evaluation of a phase relation, a phase relation between said preceding and succeeding sound elements for joining said preceding and succeeding sound elements with closer similarity of the waveforms of said preceding and succeeding sound elements in the vicinity of said junction between said preceding and succeeding sound elements.*

*71. sound synthesizing method, comprising the steps of*

*providing a sound signal the time axis of which has been compressed by a factor 1/m as compared with that of an original sound,*

*providing a signal representing a predetermined sampling period,*

*providing a write clock signal having a first frequency,*

*providing a read clock signal having a second frequency,*

*writing, as a function of said sampling period representing signal and said write clock signal, in storage means, said sound signal as a succession of sound elements, each determined by said sampling period representing signal,*

*reading, as a function of said read clock signal, said sound elements in succession from said storage means, said first frequency being selected such that the time axis of said sound elements read from said storage means is expanded by a factor m, whereby the time axis of said sound elements read from said storage means is regained to the original state of said original sound,*

*joining said sound elements read from said storage means in succession at a junction therebetween for synthesization for reproduced sound,*

*providing, as a function of said write clock signal, first data concerning the waveform of a preceding sound element being stored in said storage means and second data concerning the waveform of a succeeding sound element being stored in said storage means following said preceding sound element,*

*evaluating, based on said first data and said second data, a phase relation between the waveforms of said preceding and succeeding sound elements for providing closer similarity of said waveforms of said preceding and succeeding sound elements in the vicinity of said junction between said preceding and succeeding sound elements, and*

*controlling, based on said evaluation of a phase relation, a phase relation between said preceding and succeeding sound elements for joining said preceding and succeeding sound elements with closer similarity of the waveforms of said preceding and succeeding sound elements in the vicinity of said junction between said preceding and succeeding sound elements.*

* * * * *